United States Patent
Aro

(10) Patent No.: US 10,445,436 B2
(45) Date of Patent: Oct. 15, 2019

(54) COMPUTER AIDED MODELING

(71) Applicant: Tekla Corporation, Espoo (FI)

(72) Inventor: Jukka Aro, Helsinki (FI)

(73) Assignee: Tekla Corporation, Espoo (FI)

( * ) Notice: Subject to any disclaimer, the term of this patent is extended or adjusted under 35 U.S.C. 154(b) by 699 days.

(21) Appl. No.: 14/982,927

(22) Filed: Dec. 29, 2015

(65) Prior Publication Data

US 2016/0196362 A1    Jul. 7, 2016

(30) Foreign Application Priority Data

Jan. 5, 2015    (FI) ..................................... 20150001

(51) Int. Cl.
  *G06F 17/50*    (2006.01)
(52) U.S. Cl.
  CPC ................... *G06F 17/50* (2013.01)
(58) Field of Classification Search
  CPC ...................................................... G06F 17/50
  See application file for complete search history.

(56) References Cited

U.S. PATENT DOCUMENTS

| 6,341,291 B1 | 1/2002 | Bentley et al. |
| 2007/0157148 A1 | 7/2007 | Chang et al. |
| 2010/0043342 A1 | 2/2010 | Seppanen et al. |
| 2014/0052415 A1 | 2/2014 | Baran et al. |
| 2014/0184595 A1 | 7/2014 | Aho et al. |
| 2016/0217223 A1* | 7/2016 | Kontturi ................. G06F 17/50 |

FOREIGN PATENT DOCUMENTS

EP    1 643 335 A2    4/2006

OTHER PUBLICATIONS

Finnish Search Report for Finnish Patent Application No. 20150001, dated Aug. 19, 2015, 2 pages.

* cited by examiner

*Primary Examiner* — S. Sough
*Assistant Examiner* — Kimberly L Jordan
(74) *Attorney, Agent, or Firm* — Kilpatrick Townsend and Stockton

(57) ABSTRACT

A modeling application is provided with functionality that adapts pour breaks to be in accordance with modifications performed to cast objects forming one or more pours.

23 Claims, 14 Drawing Sheets

COMPUTER AIDED MODELING

RELATED APPLICATIONS

This application claims priority to Finnish Patent Application No. 20150001, filed on Jan. 5, 2015, the contents of which is hereby incorporated herein by reference in its entirety.

FIELD

The present invention relates to computer aided modeling.

BACKGROUND

Modeling means that a model is created from an article/structure under design for describing the article/structure to be constructed, the model containing at least information needed to illustrate the article/structure. The development of data processing systems and computers has transformed modeling into a computerized process, where a product model is created from the article/structure. A wide variety of software applications, including computer-aided design applications and three-dimensional modeling applications, are currently available to end-users to prepare or edit a model, and/or to obtain necessary information from the model.

SUMMARY

The invention relates to methods, non-transitory computer readable medias, an apparatus and a system which are characterized by what is stated in the independent claims. The preferred embodiments are disclosed in the dependent claims.

A general aspect of the invention provides a mechanism adapting one or more pour breaks affected by a modification made to a model.

BRIEF DESCRIPTION OF THE DRAWINGS

In the following, different embodiments will be described in greater detail with reference to the attached drawings, in which.

DETAILED DESCRIPTION OF SOME EMBODIMENTS

Figure 1:
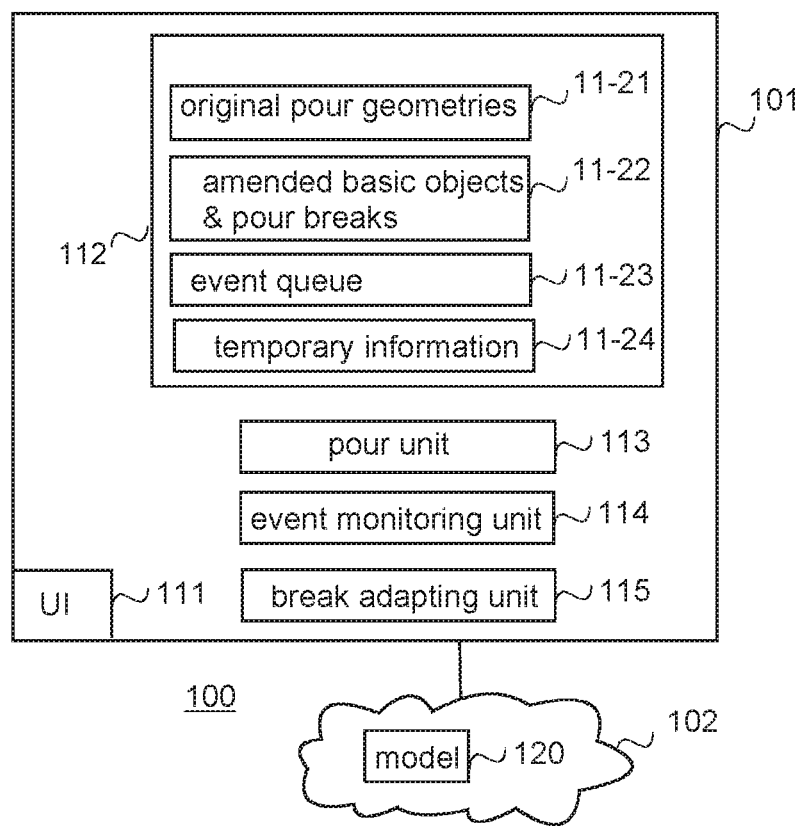
FIG. 1 shows a simplified architecture of an exemplified system having schematic block diagrams of exemplified apparatuses.

The following embodiments are exemplary. Although the specification may refer to "an", "one", or "some" embodiment(s) in several locations, this does not necessarily mean that each such reference is to the same embodiment(s)/example(s), or that the feature only applies to a single embodiment/example. Single features of different embodiments/examples may also be combined to provide other embodiments.

The present invention is applicable to any computer-aided modeling system, and corresponding modeling applications, modeling programs, computer aided designing applications/programs and solid modeling applications/programs that support or may be configured to support modeling or designing articles/structures that are to be manufactured by casting. Casting is a manufacturing process by which a liquid material is usually poured into a mold, which contains a hollow cavity of the desired shape, and then allowed to solidify. Casting materials are usually metals heated to become liquid before casting or various cold setting materials, like epoxy, concrete, plaster and clay, that cure after mixing together two or more components forming the material. Typically a desired shape of a product manufactured by casting, i.e. a cast product, is modeled by one or more objects that may overlap with each other or be in touch with each other. It is rather common to manufacture the cast product by breaking the casting into two or more separate pours (casts). A pour, or its geometry defined by the objects, defines the amount (volume) of casting material used/to be used (poured/casted) in one go. The manufacture process for a concrete may be called concrete casting, casting of concrete, concrete pouring, concrete spouting, casting, pouring, spouting or, concreting, for example. The manufacture process of other materials may be called casting, molding, foundering, forming, liquid casting, potting and throwing, for example.

In the following, different examples are described assuming that a modeling application is configured to use a solution disclosed in US patent application 2014/0184595 for determining pour units (pours), without restricting the invention to such a solution. US patent application 2014/0184595 is assigned to the applicant, and hereby incorporated by reference. The solution in US patent application 2014/0184595 uses connectivity graphs and pour graphs to create pour units. Thanks to the use of the graphs, less processing resources are needed, the process is quicker and the performance much better compared to a solution which use mere solid representations. Nevertheless, it should be appreciated that the below described functionality is implementable also when mere solid representations are used; it suffices that it is possible to distinguish a direction of a normal of a break, using the right hand rule or inward-pointing, for example. Various programming techniques, storage of data in memory and manners of modeling/designing real world articles and implementing databases develop constantly. This may require extra changes in the invention. Consequently, all terms and expressions should be interpreted broadly, and they are intended to describe, not to restrict, the invention.

FIG. 1 illustrates a simplified modeling system 100 comprising one or more apparatuses 101 (only one shown in FIG. 1) connected to a data storage 102 storing a model 120. It is obvious to a person skilled in the art that the system may also comprise other functions and structures that need not be described in greater detail here and that the data storage may be an integral part of the apparatus. Further, details of the disclosed structures and apparatuses that are not disclosed below, are irrelevant to the invention, and therefore they are not described in detail here.

For implementing one or more of the below described functionalities, the apparatus 101 illustrated in FIG. 1 comprises one or more user interfaces 111 (only one shown in FIG. 1), one or more memories 112 (only one shown in FIG. 1), a pour unit 113 for creating/resolving pours, for example as disclosed in US patent application 2014/0184595, an event monitoring unit 114 for monitoring pour break related modifications, and a break adapting unit 115 for adapting pour breaks to correspond modifications. It should be appreciated that the event monitoring unit 114 and/or the break adapting unit 115 may be a sub-unit of the pour unit. Further, in other implementations the apparatus may comprise one or two of the pour unit 113, the event monitoring unit 114 and the break adapting unit 115, the other one(s) being implemented centrally, or the pour unit 113, the event monitoring unit 114 and the break adapting unit 115 may be implemented centrally. The computing apparatus 101 may be any apparatus with which the model may be created and/or downloaded and/or edited and/or viewed and/or accessed and/or stored (uploaded) to the data storage 102, or otherwise handled/processed. Examples of apparatuses include a server, like a cloud server or a grid server, and a terminal device, such as a user terminal, a work station, a laptop, a smartphone, a personal computer, a tablet computer, a field device, an e-reading device, or a personal digital assistant (PDA).

A user interface 111 is the interface of the user, i.e. the person processing the model, to the modeling system. The user can create a model, modify a model, study it, output desired drawings and reports of the model, view the drawings, input information to the model, etc. by the means of the user interface 111.

The apparatus may generally include one or more volatile and/or non-volatile memories 112 that may be configured to store a working version (a working copy) of a model or part of the model the user has selected to process, for example as a "run-time database". Typically at least some data of the model are read from the data storage, and during processing the data constitute a "run-time database" in a central memory, for example, of the computing apparatus, where the data can be processed faster. When the processing ends the run-time data, or part of the run time data in the memory may be stored in the data storage.

In the illustrated example the "run-time database", i.e. the memory 112 comprises retrieved data of the model 11-21, amended data of the model 11-22, an event queue 11-23 and temporary information 11-24. In the illustrated example, the retrieved data of the model 11-21 comprises at least information by means of which geometry information of pours, i.e. pour units, is determinable. The geometry information may be based on definitions of original basic objects forming at least part of the model and information on original pour breaks, added to the model. Instead of term "pour break" another corresponding term, such as a casting seam, a feather and construction joint, may be used. A pour break represents a location in which a user (modeler) intends to break a continuous cast product with the intention to manufacture (fabricate, produce) the continuous cast product by two or more pours. For example, concrete walls or slabs may have to be poured in sections for a variety of reasons: not enough concrete available for delivery; small finishing crew (cannot finish a larger pour); the contents of the pour (rebar and mechanical) may be so intensive that only sections of it are done at a time; surface finishing may be different; or a continuous cast product comprises actually different materials, for example concrete of different strengths. The term "original" used herein means data that represent model definitions when the event queue is empty after model data has been retrieved from the model 120, or after the event queue has been emptied or otherwise updated as a result of the below described functionality. Instead of "original", other terms, like "initial" or "starting" or "resistent" or "permanent" could be used. The amended data of the model 11-22 comprises at least definitions of amended basic objects and information on amended pour breaks that have not yet undergone the below described operation, and hence are not yet reflected to the original information. For example, the amended definitions may contain a new location and/or one or more new dimensions. Instead of "amended data", term "current data" or "change data" or "modified data" or "local data" could be used as well. However, it should be appreciated that the difference between "original data" and "amended data" as used herein is merely for illustrative purposes and means situation in the local run-time database, "original break", "original object", etc. meaning a break, an object, etc. in the original situation, and "amended break", "amended object", etc. meaning a break, an object, etc. in the amended situation (even though the break, the object, etc. has not itself being modified), and does not affect to actual operations performed when the local run-time database is synchronized/updated with the model in the data repository. The event queue 11-23 comprises information relating to amendments made to basic objects representing cast products and to pour breaks, as will be described in more detail below with FIG. 2. The information for an amendment may comprise an identifier that is unique at least within the model, type information indicating whether the amended object is a basic object or a pour break, and the event itself. However, information also on other kind of amendments may be maintained. In other words, information on amendments relating at least to object definitions made to the model is maintained. Different examples of temporary information will be described in more detail below with FIGS. 4 to 13.

Although not illustrated in FIG. 1, each basic object is associated with an object identifier and each break is associated with a break identifier, an identifier being unique at least within the model.

The term "object" used herein means an object representing/modeling an article that will or may exist in real world or at least is planned to exist in real world, and the term "basic object" means a separate object used by a modeler to create a more complex object comprising at least two basic objects. Typically, but not necessarily, the basic object has a geometric fundamental (basic) form, like a circle, a triangle, a square, a rectangle, a parallelogram, cube, a ball, a hemisphere, a cylinder, a cone, a prism, a parallelepiped and a pyramid. However, the basic object may be any arbitrary shaped solid boundary representation object. Further, it should be appreciated that the term "article" used herein means anything that will or may exist in real world or at least is planned to exist in real world and that may be modeled by a modeling application, covering one or more single pieces/articles, one or more parts, one or more assemblies including sub-assemblies, and one or more structures. An object may also be called an entity, a model, a product model, a product model of a structure, a model of a structure, a representation of a structure and a digital structure. Further, instead of term structure, corresponding terms of real world structures, like article, element, piece and part may be used as well.

In the illustrated examples it is assumed, for sake of clarity, that a pour break, also called herein a break, is an infinite plane, a finite plane or any type of a polygon or a chain of polygons with a finite surface that may have any shape. However, it should be appreciated that a break may have any shape, like a curve or combination of different curves, as long as the break has two different sides and the surface is not non-manifold. A non-manifold surface is a surface that branches, and hence cannot exist in the real world. An example of a non-manifold surface is a surface in which more than two faces is attached to one edge. To summon up, a pour break is an object that has a shape with a not non-manifold surface, two different sides and a location in the model.

In the illustrated example the modeling system comprises the apparatus as a terminal/client and the data storage 102 is a separate data repository or database comprising data 120 relating to a model. The data repository may be any kind of conventional or future data repository, including distributed and centralized storing of data, managed by any suitable management system. An example of a distributed storing includes a cloud based storage in a cloud environment (which may be a public cloud, a community cloud, a private cloud, or a hybrid cloud, for example). The implementation of the data repository and the way how the data is stored, retrieved and updated bears no significance to the invention, and need not to be described in detail here. Further, as said above, at the simplest, the data 120 relating to the model is stored to the apparatus.

In the following, the invention will be described assuming that when a basic object or a break is modified, the modification is implemented as a combination of a deletion and an addition. In other words, the original basic object/break is deleted and the modified basic object/break is added as a new basic object/break that has the same identifier as the original basic object/break, without restricting the example to such a solution. Instead of using the two different event types (deletion, add), three different event types (deletion, add, modification), or more different event types (deletion, add, move, size change, etc.) may be used as well.

Figure 2:
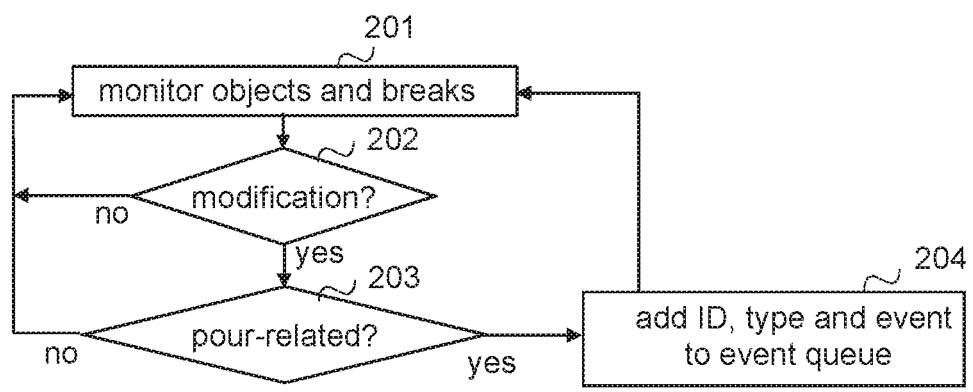
FIGS. 2 to 14 are flow charts illustrating different exemplary functionalities.

FIG. 2 is a flow chart illustrating an exemplified exemplary background run, i.e. an exemplary functionality of the event monitoring unit, to maintain the event queue. In the illustrated Figure, it is assumed that a model is either created from scratch or an earlier created model is read into a run-time database, wherein the read in model may comprise one or more basic objects and one or more pour breaks. The targets of monitoring the events and buffering them to the event queue are to minimize the amount of unnecessary calculations while ensuring that breaks that should be adapted are adapted.

Referring to FIG. 2, modeling is monitored in step 201 until a modification is detected (step 202). A modification may be adding one or more new basic objects and/or breaks, deleting one or more basic objects and/or breaks, moving one or more basic objects and/or breaks, and/or amending one or more parameters/definitions of one or more basic objects and/or breaks. By amending one or more parameters/definitions a size may be changed, for example. Below it is assumed, for the sake of clarity, that only one modification is performed for one basic object or one break at a time without restricting the example to such a solution. In other words, a simultaneous movement of a basic object and a break is assumed to be four consecutive separate modifications: deletion of the basic object, adding a new basic object having the identifier of the deleted basic object, deletion of the break, and adding a new break having the identifier of the deleted break. It is obvious to one skilled in the art how to implement the example to several simultaneous modifications.

In response to detecting a modification in step 202, it is checked in step 203, whether or not the modified object is a pour-related object, such as a basic object or a pour break. If yes, the identifier of the object, indication on the type (a basic object or a break), and the modifying event are added in step 204 to the event queue. Then the process returns to step 201 to monitor the modeling.

If the modified object is not related with pours (step 203), the modified object is not added to the event queue but the process returns to step 201 to monitor the modeling.

Hence, the event queue indicates the order of the events; first event in the queue has happened first.

Figure 3:
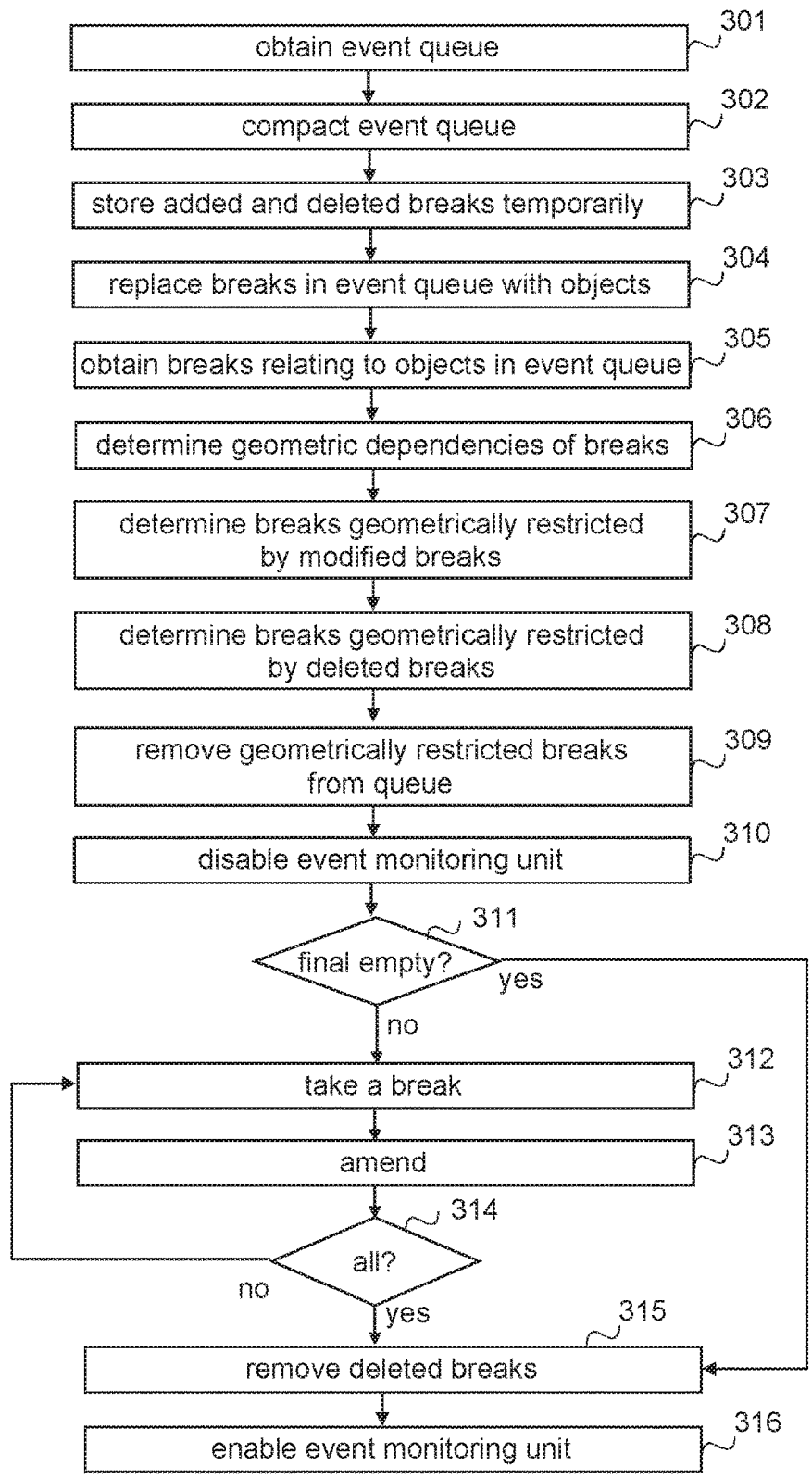

FIG. 3 is a flow chart describing an exemplary functionality how to adapt the pour breaks to be in accordance with a modified situation. The functionality may be performed by the break adapting unit, or by the break adapting unit and the pour unit. In the example illustrated in FIG. 3, a sequential processing/execution order is assumed, for the sake of clarity, without restricting the example to such a solution. For example, if concurrent processing will be used, different synchronization mechanism, like locking by a mutex or a semaphore, may be used to ensure proper functionality, as is known by one skilled in the art. Therefore the alternatives need not be described in detail herein.

The functionality illustrated in FIG. 3 describes an automatic process triggered in response to the system detecting a need for adapted pour breaks. The need may be detected automatically in response to detecting that the user has selected to store updates to the model in the data storage, the adapting being performed as a background process before the actual storing. Another example, when the need may be detected automatically, is that a user selects "show pour units" functionality.

Referring to FIG. 3, in response to detecting a need to adapt pour breaks, the event queue, created as described above with FIG. 2, is obtained/retrieved to be processed. The obtained event queue is compacted in step 302 to a compact event queue, and information on added and deleted breaks is stored in step 303 temporarily. An example how to perform the compacting and temporarily storing is described in more detail below with FIG. 4. In the example the storing is performed simultaneously but that need not to be the case.

Figure 5:
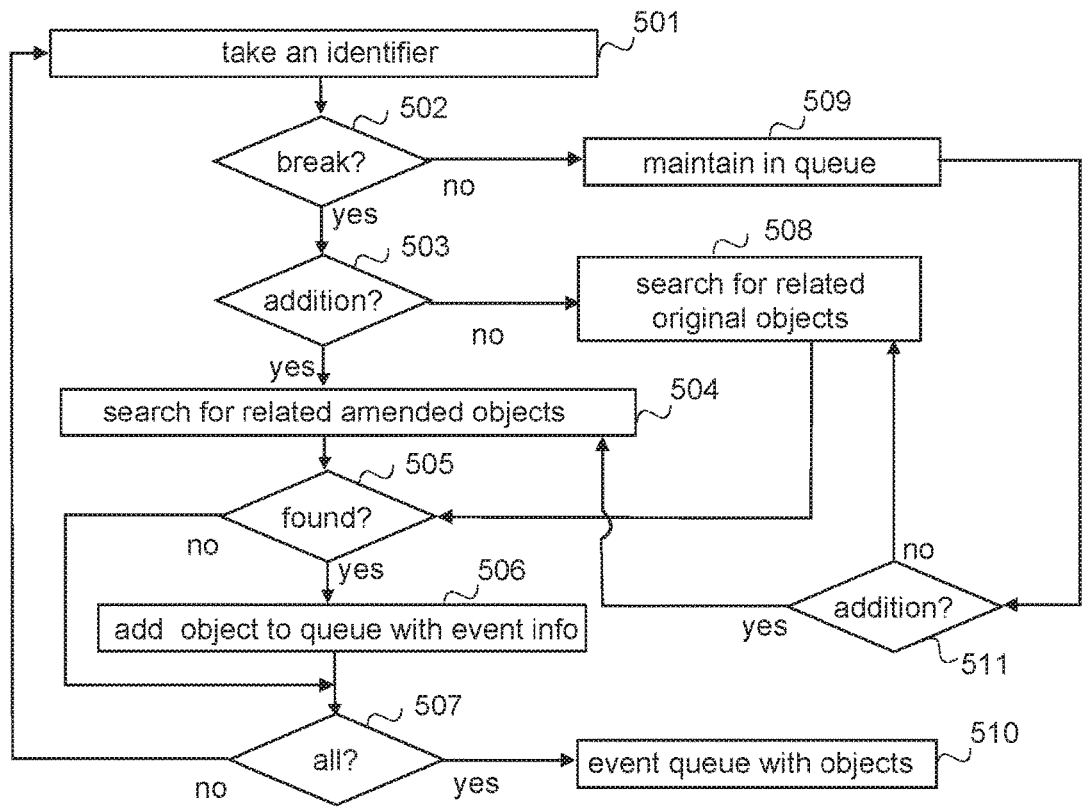
Figure 6:
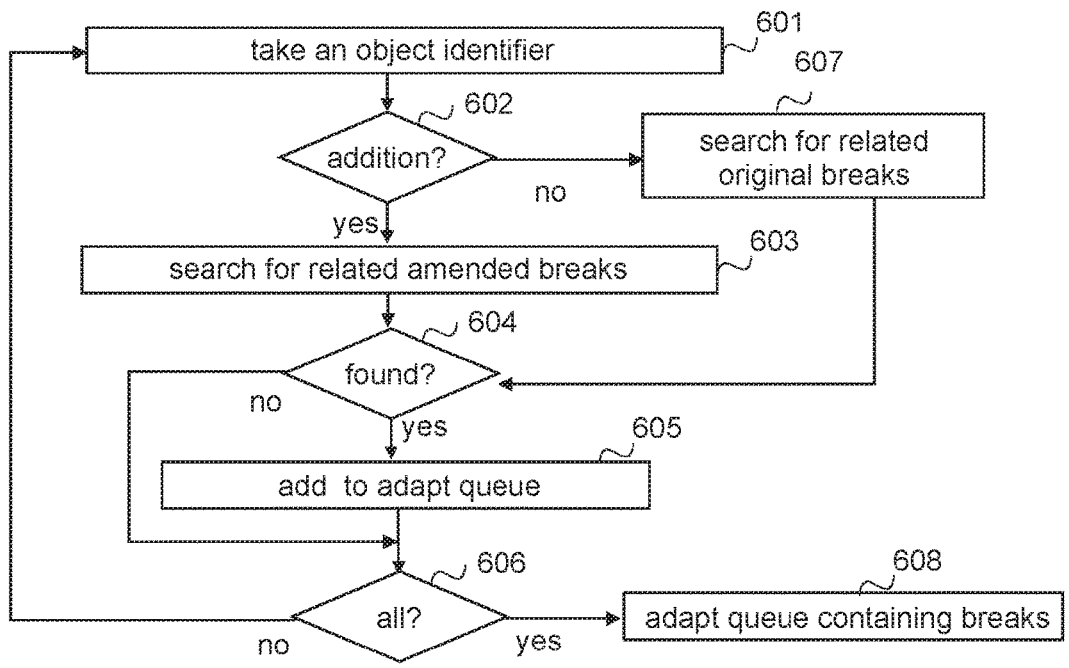
Figure 20:
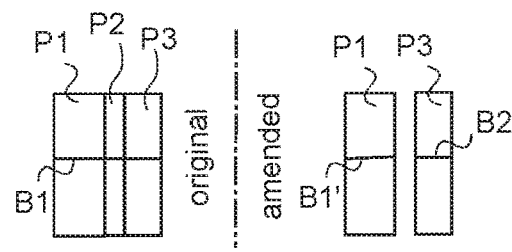

To ensure that all breaks that possible may need to be adapted, are found, steps 304 and 305 are performed to first find out basic objects that relates to the breaks in the compacted event queue, and then to find breaks that relate to those basic objects found in step 304, and to those basic objects already in the queue. For example, if a break A is moved and the break A cuts an object B and restricts a break C that also cuts the object B, only the break A will be in the event queue, not the break C and not the object B, and by performing steps 304 and 305, the break C that needs to be adapted to the new situations, will be found. Another example is illustrated in FIG. 20. A basic object P2 is deleted, and hence it will be in the event queue, not a break B1. Thanks to step 305, the break B1 will be added to list and will be split to two breaks B1 and B2 because of the deletion of the basic object P2. FIG. 5 illustrates an example how to convert the event queue comprising both break identifiers and basic object identifiers to an event queue comprising only basic object identifiers with events, and FIG. 6 illustrates an example how the event queue comprising only basic object identifiers is converted to an adapt queue comprising only break identifiers.

Figure 7:
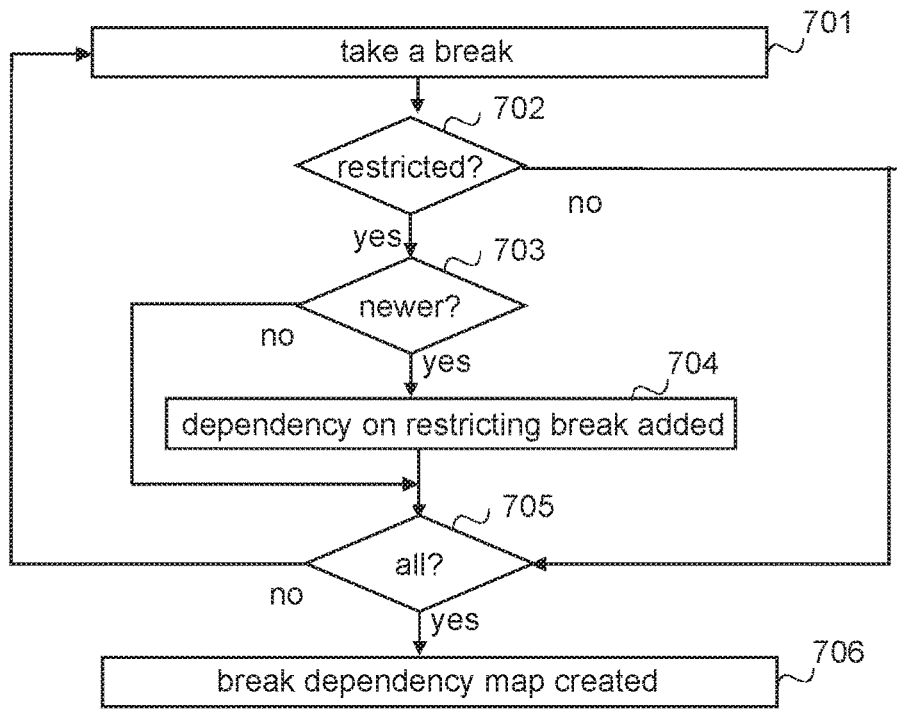

In the illustrated example, when the adapt queue comprises all breaks that possible may need to be adapted, a dependency map illustrating dependencies of breaks in the adapt queue is formed in step 306. The dependency map is an aid tool, and instead of forming the dependency map, corresponding functionality may be performed each time a dependency is needed. However, with the dependency map the amount of needed calculations is minimized and the process is faster compared to a situation in which no dependency map is used. An example how to create/form a dependency map is illustrated in FIG. 7. The dependency map is preferably a temporary map.

Figure 8:
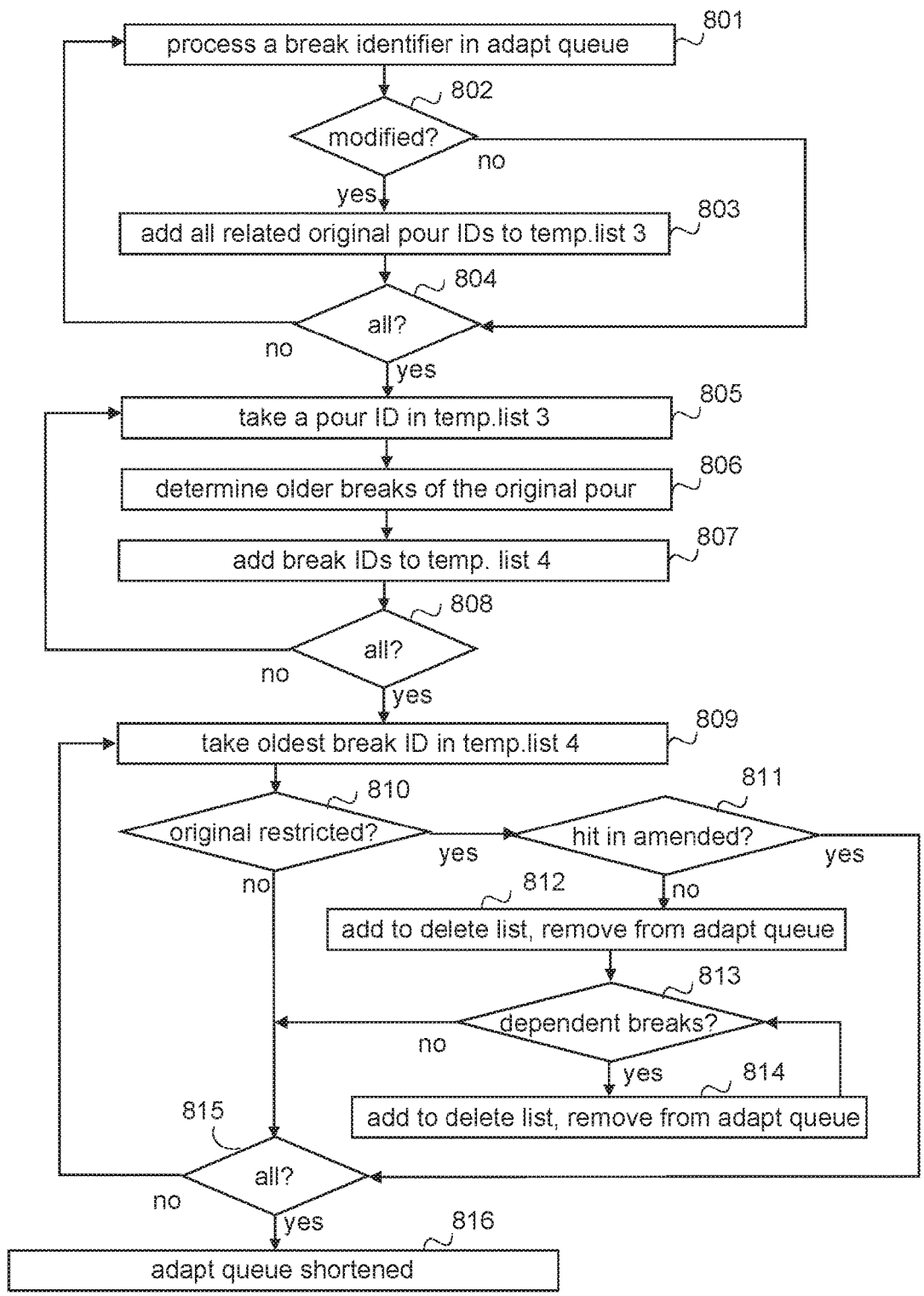
Figure 9:
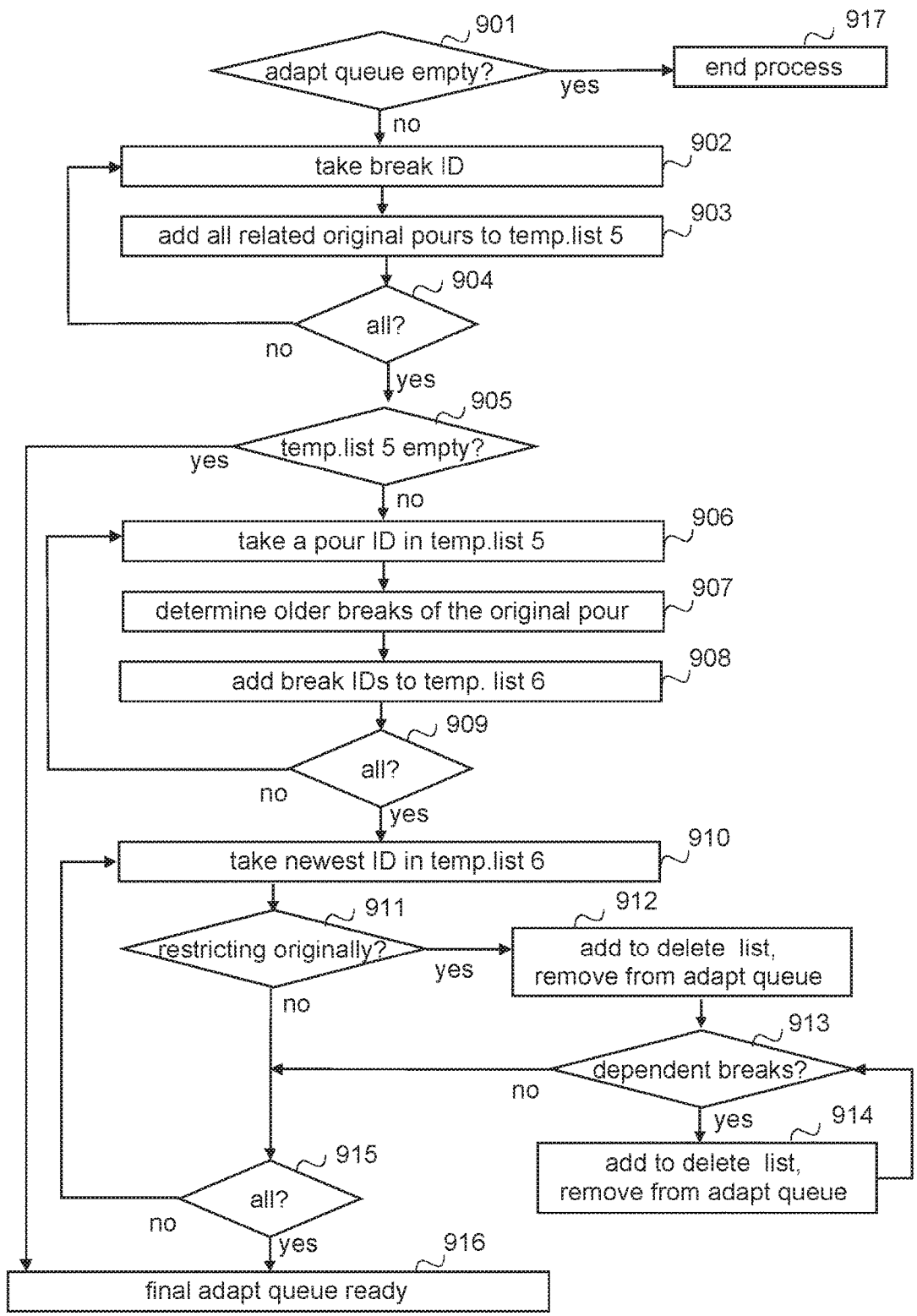

To minimize the amount of breaks that will undergo the actual adapting procedure (amendment procedure), the process determines breaks that will be deleted; performing adapting and then deleting the adapted break uses unnecessarily calculation resources and the end result would still be the same. In the illustrated example breaks that will be deleted are found by determining in step 307 breaks that are geometrically restricted by modified breaks and by determining in step 308 from remaining breaks in the adapt queue those breaks that are geometrically restricted by deleted breaks or breaks to be deleted, using information on deleted breaks stored in step 303. FIG. 8 illustrates an example how to perform step 307 and part of step 309, and FIG. 9 illustrates an example how to perform step 308 and part of step 309. The adapt queue wherefrom deleted breaks and those breaks determined to be deleted are removed, is called herein a final adapt queue.

When the final adapt queue is ready the event monitoring unit is disabled in step 310. By disabling the event monitoring unit it is ensured that amendments performed here to breaks will not end up to the event queue. Thanks to that, a recursion, i.e. amendments performed here ending up to be processed according to the process described herein, etc., is avoided.

Then it is checked in step 311, whether or not the final adapt queue is empty. If not, there is at least one break that is assumed to be amended/adapted and a break in the final adapt queue is taken in step 312 to be processed, and the break undergoes an amendment procedure, i.e. is amended in step 313. An exemplary amendment procedure is described below with FIGS. 10 to 13, in which the break undergoing the amendment procedure is called a target break. After the break has undergone the amendment procedure, it is checked in step 314, whether or not all breaks in the final adapt queue are processed. If not, the process continues to step 312 to take a break to be processed.

If all breaks in the final adapt queue are processed (step 314), or if the final adapt queue was empty (step 311), deleted breaks, including breaks intended to be deleted, i.e. breaks in the delete list, or at least those breaks that are added during the above described processes to the list created in step 303, are removed/deleted in step 315 from the model, and the event monitoring unit is enabled in step 316.

Figure 4:
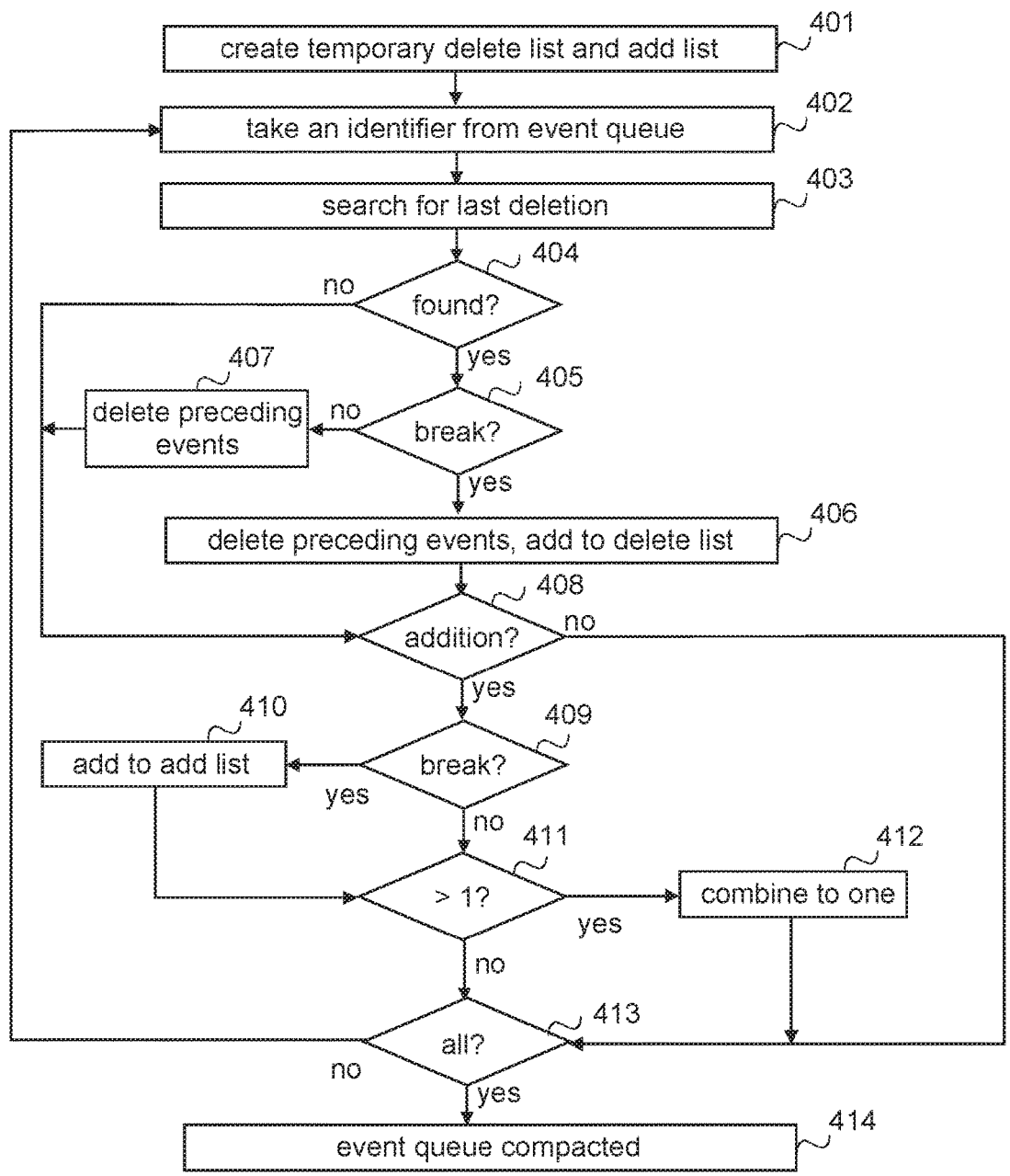

FIG. 4 illustrates an exemplary functionality to perform steps 302 and 303 in FIG. 3. In other words, it illustrates a kind of filtering functionality targeted to obtain a compact event queue. In the illustrated solution information on added and deleted breaks is stored temporarily to an "add list" and to a "delete list", correspondingly, simultaneously with the compacting, without restricting the example to such a temporary storing solution.

Referring to FIG. 4, in the illustrated example, the temporary add list and the temporary delete list for breaks are created in step 401, and an identifier in the event queue is taken in step 402 to be processed. The identifiers in the event queue may be processed in any order. One may start from the end of the event queue, i.e. from the last identifier, for example. Then the last, i.e. latest, deletion amongst events associated with the identifier taken in step 402 to be processed is search for in step 403. If such an event "deletion" is found (step 404), and the identifier is for a break (step 405), all preceding events associated with the identifier are deleted in step 406 from the event queue and the last deletion is added with the identifier to the delete list. If the event "deletion" is found (step 404) and the identifier is for a basic object, not for a break (step 405), all preceding events associated with the identifier are deleted in step 407 from the event queue. Deleting all previous events, regardless of their type, can be performed since the last delete is the decisive delete.

After deleting preceding events (step 406 or step 407), or if no "deletion" is found (step 404), it is checked in step 408, whether or not the event queue contains an addition associated with the identifier. If yes, and the identifier is for a break (step 409), the addition is added in step 410 with the identifier to the add list. Then, or if the identifier is not for a break (step 409), it is checked in step 411, whether the amount of events is more than one. If yes, the two events, i.e. a deletion and an addition of the same object, are combined in step 412 to be one event, an addition, in the compact event queue. After that, or if zero or one event is found in step 408, it is checked in step 413, whether or not all identifiers in the compact event queue are processed. If not, the process proceeds to step 402 to process the next identifier.

If all identifiers are processed, the event queue is compacted and ready to be used (step 414) by later processes. The temporary break lists (add list and delete list) are also ready to be used later. By compacting the event queue, the amount of events is minimized to comprise only those events that need to be taken into account and that affect to the result hence ensuring that the end result is what it would be without compacting but less processing capacity is required. That makes the processing faster.

FIG. 5 illustrates an exemplary functionality how to perform step 304 in FIG. 3. Referring to FIG. 5, an identifier in the compact event queue is taken in step 501 to be processed. If the identifier is an identifier of a break (step 502; yes), it is checked in step 503, whether or not the associated event is an addition.

If the associated event is an addition (step 503), related amended basic objects are searched for in step 504 from basic objects and pour breaks in the amended situation. A basic object is a related object to a break if it touches the break, overlaps the break, or is within a predetermined proximity from the break. For example, an extrema box with a marginal/tolerance may be defined for the break, and a related basic object intersects at least one point on the extrema box boundaries or is within the extrema box. The extrema box for a break is determined by determining/calculating coordinates of a minimum point of the break and coordinates of a maximum point of the break, and then creating a three dimensional cuboid (box). If one or more such related basic objects are found (step 505), an identifier of each found basic object is added in step 506 to the event queue with addition as event information. In other words, the break identifier is replaced by one or more basic object identifiers. After that, or if no related basic object is found in step 505, it is checked in step 507, whether or not all identifiers in the compact event queue are processed. If not, the process proceeds to step 501 to process the next identifier. If all identifiers are processed, the compact event queue is turned to be an event queue comprising basic object identifiers (step 510) and the event queue is ready to be processed by later processes.

If the associated event is not an addition (step 503), it is a deletion of a break and related original basic objects are searched for in step 508 from the original basic objects and pour breaks. In the illustrated example it is assumed that pour units, or at least pour graphs for pour units, using the original basic objects and pour breaks have been created as a background run as described in the US patent application 2014/0184595, and the related original basic objects can be easily found from the pour graphs; the related basic objects are those that are in a pour graph having the break at one end. Examples of pour graphs are illustrated in FIGS. 15 to 18. Naturally one may obtain the same information by studying basic objects and the break as defined in the original definitions. If one or more such related basic objects are found (step 505), the process proceeds to step 506 to add one or more basic object identifiers to the event queue with a deletion as event information.

If the identifier is not an identifier of a break (step 502; no), the identifier is a basic object identifier, and it is maintained (step 509) in the event queue. Then it is checked in step 511, whether or not the associated event is an addition.

If the associated event is an addition (step 511), related amended basic objects are searched for in step 504 from the basic objects and pour breaks in the amended situation. A basic object is a related object to another basic object if it is directly or indirectly (i.e. via one or more basic objects) connected to the basic object. If one or more such related basic objects are found (step 505), an identifier of each found basic object is added in step 506 to the event queue with addition as event information.

If the associated event is not an addition (step 511), it is a deletion of a basic object and the process proceeds to step 508 to search for related original basic objects from the basic objects and pour breaks in the original situation.

By adding connected/related basic objects it is ensured that a break not hitting the basic object in question but that still may need to be adapted, will be taken into account.

FIG. 6 illustrates an exemplary functionality how to perform step 305 in FIG. 3. In other words, it describes how the event queue that comprises only basic object identifiers with event information is emptied and an adapt queue comprising only break identifiers of breaks that may or may not be adapted is created.

Referring to FIG. 6, an identifier in the event queue is taken in step 601 to be processed. The identifier is a basic object identifier, since the event queue does not contain any other kind of identifiers at this point of processing. Firstly, it is checked in step 602, whether or not the associated event of the identifier is an addition.

If the associated event is an addition (step 602), related amended breaks are searched for in step 603 from the amended basic objects and amended pour breaks maintained in the memory. A break is a related break if the break (including its extrema box with a margin/tolerance, if extrema box solution is used) hits (falls on) the basic object. If one or more such related breaks are found (step 604), an identifier of each found break is added in step 605 to the adapt queue, and the add list and the delete list are updated correspondingly. After that, or if no related break is found in step 604, it is checked in step 606, whether or not all basic object identifiers in the event queue are processed. If not, the process proceeds to step 601 to process the next identifier. If all basic object identifiers are processed, the adapt queue comprises breaks identifiers (step 608) of breaks that may need to be adapted, but not breaks that for sure do not need to be adapted. In the illustrated example, the event queue is in praxis now empty.

If the associated event is not an addition (step 602), it is a deletion of a basic object and related original breaks are searched for in step 607 from the original basic objects and pour breaks. In the illustrated example it is assumed that pour units, or at least pour graphs for pour units, are used to easily found breaks from the pour graphs; the related breaks are those that are in one or more pour graphs having the basic object and being restricted at least by one break. Naturally one may obtain the same information by studying the basic objects and breaks as defined in the original definitions. If one or more such related breaks are found (step 604), the process proceeds to step 605 to add one or more break identifiers to the adapt queue, and update the delete list correspondingly.

FIG. 7 illustrates an exemplary functionality how to perform step 306 in FIG. 3. In other words, it describes an exemplary functionality how to create a break dependency map. The illustrated process uses the adapt queue outputted by the process illustrated in FIG. 6 without affecting to the contents of the adapt queue. In the example it is assumed that a creation order defines the dependency: a break cannot depend on an older break, without limiting the example to such a solution.

Referring to FIG. 7, a break, or more precisely a break identifier, is taken in step 701, to be processed. It is checked, in step 702, whether or not the break is restricted to one or more other breaks. In the illustrated example it is assumed that a break is restricted to another break, if the break ends to or starts from another break or a boundary of an extrema box of another break with a tolerances excluding the end and start points of another break. In another words, a restricted break does not start from or end to an endpoint of a restricting break. A further assumption made here is that a restricted break is newer than a restricting break. However, it should be appreciated that any other definition for a restricted/restricting break may be used as well, and implementing such an alternative is straightforward for one skilled in the art.

If the break is restricted to one or more other breaks (step 702), it is checked in step 703, whether or not the break is newer, i.e. created later, than any of the one or more other breaks. For example, creation times of the breaks may be used for determining which one is newer. If the break is newer (step 703), it depends on the restricting break, and a corresponding dependency on the restricting older break is added in step 704 to a dependency map. Then, or if the break was not newer than any of the one or more breaks (step 703), the process proceeds to step 705 to check, whether or not all break identifiers in the adapt queue are processed, i.e. dependency mapped. If not, the process proceeds to step 701 to process an unprocessed break.

If the break is not restricted (step 702), there is no dependency and the process proceeds to step 705 to check, whether or not all break identifiers in the adapt queue are processed.

If all break identifiers in the adapt queue are processed, the break dependency map has been created (step 706). In the illustrated example, if a break is missing from the dependency map, it indicates that it does not depend on any other break and that no other break depends on the break.

FIG. 8 illustrates an exemplary functionality how to perform step 307, and part of step 309, in FIG. 3. In the process of FIG. 8, breaks that are restricted by a modified break are searched for using the adapt queue outputted by the process illustrated in FIG. 6, and utilizing the pour graphs described above with FIG. 5, for example. Further, in the illustrated example it is assumed that the adapt queue, or any of the used temporary lists are not empty, for the sake of clarity.

Referring to FIG. 8, a break identifier in the adapt queue is taken to be processed in step 801. Then it is checked in step 802, whether or not the break identifier is associated with a break that has been modified. In the illustrated example, a modified break has two consecutive events in the event queue, i.e. a deletion and an addition, as is described above. In the illustrated example, since the event queue was emptied, the add list and the delete list, described above with FIG. 4, are used in the checking: if the identifier is in both lists, the break identifier is associated with a break that has been modified.

If the break is a modified break (step 802), all original pours, i.e. pours created on the basis of the original situation, that relates to the break are searched for and their identifiers are added in step 803 to a temporary list 3 so that one or more pour identifiers are associated with the break identifier. Such a break is called with this Figure "a root break" so that different breaks are not mixed. Then it is checked in step 804, whether or not all break identifiers in the adapt queue are processed. If not, the process proceeds to step 801 to process an unprocessed break.

If the break is not a modified break (step 802), it is checked in step 804, whether or not all break identifiers in the adapt queue are processed.

If all break identifiers in the adapt queue are processed (step 804), the pour identifiers in the temporary list 3 are processed by taking in step 805 a pour identifier from the temporary list 3, and then all breaks that are newer than the root break (i.e. the break with which the pour is associated in the temporary list 3) and that restrict in the original situation the pour are determined in step 806. The determined breaks, or more precisely their identifiers, are added in step 807 to a temporary list 4 and associated with the root break identifier. Then it is checked in step 808, whether or not all pour identifiers in the temporary list 3 are processed. If not, the process proceeds to step 805 to process an unprocessed pour.

If all pour identifiers in the temporary list 3 are processed (step 808), the break identifiers in the temporary list 4 are processed by taking in step 809 the oldest unprocessed break, or more precisely oldest unprocessed break identifier, to be processed. In other words, they are processed in the creation order.

Firstly it is checked in step 810, whether the break was restricted by the root break in the original situation. If it was, it is checked in step 811, whether or not an extended break hits the root break in the amended situation. (An example how to extend a break is described with FIG. 10.) If it does not hit, the break is added in step 812 to the temporary delete break list (see FIG. 4), and removed in step 812 from the adapt queue. Then the dependency map is used to determine breaks that depend on the break added to the delete break list. If a break depends on the break added to the delete break list (step 813), it also is added in step 814 to the delete break list and removed from the adapt queue. Then the process returns to step 813 to check whether there are breaks that depend on the break added to the list.

When no more dependent breaks are found (step 813), or the break was not restricted by the root break in the original situation (step 810), or if the break hits the root break in the amended situation (step 811), the process proceeds to step 815 to check, whether all break identifiers in the temporary list 4 are processed.

If all breaks on the temporary list 4 are processed (step 815), the adapt queue has been shortened by removing therefrom breaks that will be deleted, and hence do not need to be amended/adapted.

FIG. 9 illustrates an exemplary functionality how to perform step 308, and part of step 309, in FIG. 3. In the process of FIG. 9, breaks that are restricted in the original situation by a break that will be deleted are searched for using the shortened adapt queue outputted by the process illustrated in FIG. 8, and utilizing the pour graphs described above with FIG. 5, for example.

Referring to FIG. 9, the process starts by checking in step 901, whether or not the shortened adapt queue is an empty queue. If not, a break identifier in the shortened adapt queue is taken to be processed in step 902, and all original pours, i.e. pours created on the basis of the original situation, that relates to the break are searched for and their identifiers are added in step 903 to a temporary list 5 so that one or more pour identifiers are associated with the break identifier. Such a break is called with this Figure "a root break" so that different breaks are not mixed. Then it is checked in step 904, whether or not all break identifiers in the shortened adapt queue are processed. If not, the process proceeds to step 902 to process an unprocessed break.

If all break identifiers in the shortened adapt queue are processed (step 904), it is checked in step 905, whether or not the temporary list 5 is empty. If not, the pour identifiers in the temporary list 5 are processed by taking in step 906 a pour identifier from the temporary list 5, and then all breaks that are older than the root break (i.e. the break with which the pour is associated in the temporary list 5) and that restrict in the original situation the pour are determined in step 907. The determined breaks, or more precisely their identifiers, are added in step 908 to a temporary list 6 and associated with the root break identifier. Then it is checked in step 909, whether or not all pour identifiers in the temporary list 5 are processed. If not, the process proceeds to step 906 to process an unprocessed pour identifier.

If all pour identifiers in the temporary list 5 are processed (step 909), the break identifiers in the temporary list 6 are processed by taking in step 910 the newest unprocessed break, or more precisely newest unprocessed break identifier, to be processed. In other words, they are processed in reversed creation order.

Firstly it is checked in step 911, whether the break restricts the root break in the original situation. If it restricts, the root break is added in step 912 to the temporary delete break list (see FIG. 4), and removed in step 912 from the shortened adapt queue, and all older breaks associated with the root break are removed from the temporary list 6. Then the dependency map is used to determine zero or more breaks that depend on the root break added to the delete break list. If a break depends on the break added to the delete break list (step 913), it also is added in step 914 to the delete break list and removed from the shortened adapt queue. Then the process returns to step 913 to check whether there are breaks that depend on the break added to the list.

When no more dependent breaks are found (step 913), or the break was not restricting the root break in the original situation (step 911), the process proceeds to step 915 to check, whether or not all break identifiers in the temporary list 6 are processed.

If all breaks on the temporary list 6 are processed (step 915), or if the temporary list 5 was empty (step 905), the shortened adapt queue has been more shortened by removing therefrom further breaks that will be deleted, and hence do not need to be amended/adapted, and the final adapt queue is ready.

Figure 10:
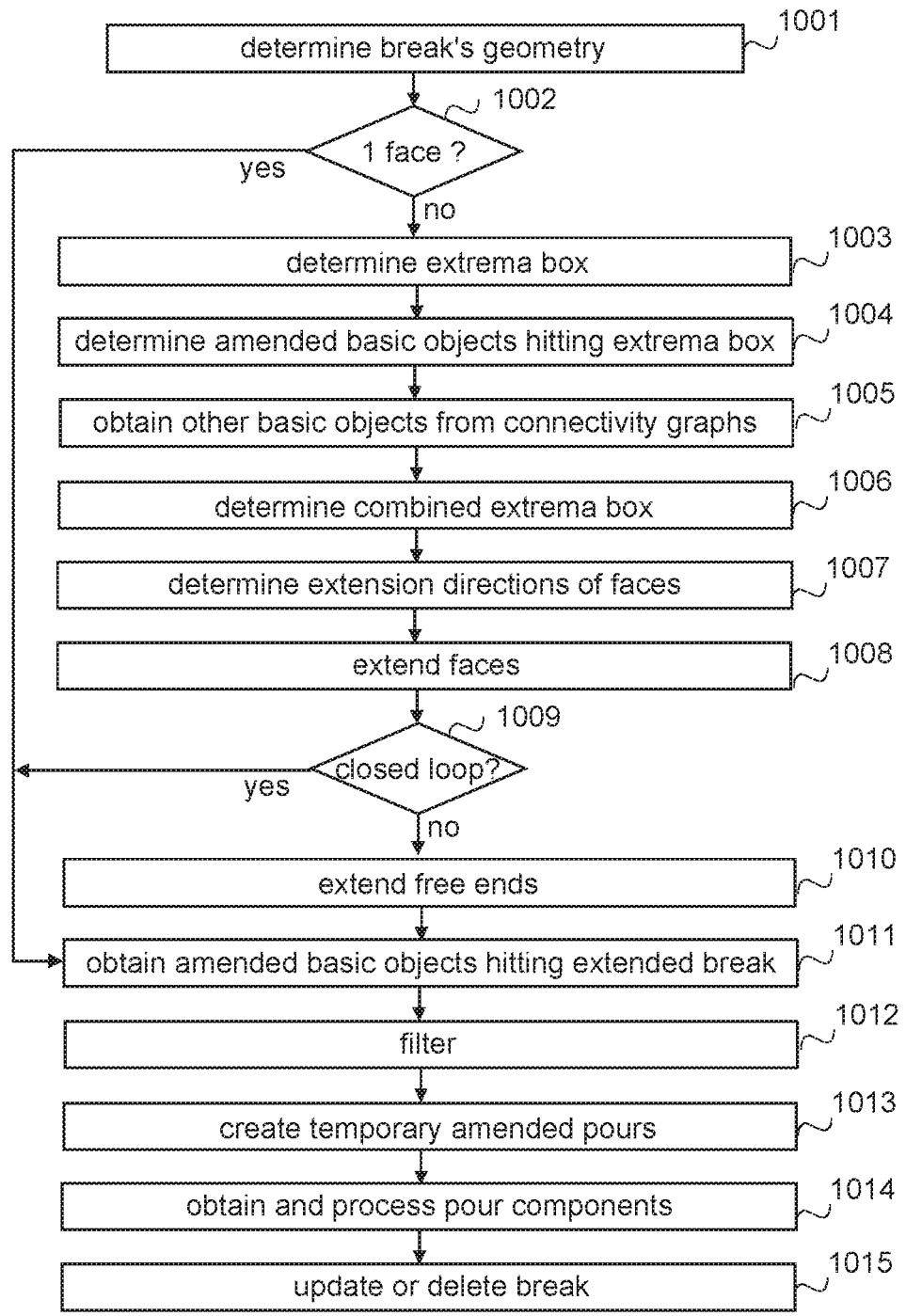

FIG. 10 illustrates an exemplary functionality how to perform the amendment procedure of step 313 in FIG. 3 for a single break, called target break.

Referring to FIG. 10, since a break (the target break) may have any shape, its geometry is determined in step 1001. It should be appreciated that the geometry determined herein is for a copied or moved break but it uses the geometry in the original situation, i.e. not yet the amended/adapted geometry. (The amended geometry is not yet known, so it cannot be used.) If the break is not a planar break (step 1002), i.e. the break is a polyline break having two or more faces, it has to be ensured that a three dimensional polysurface (or a polymesh) of the polyline break is large enough to split the possibly modified underlying cast product geometry formed by one or more basic objects. The creation of the polysurface starts by determining in step 1003 an extrema box for the break, and after that those basic objects in the amended situation that hit the extrema box are determined in step 1004. Further, all basic objects that are connected to the hitting basic object(s) are determined in step 1004. When the graph solution is used, connected basic objects are easily determined by obtaining them from connectivity graphs created in the amended situation. Then a combined, or extended, extrema box is determined in step 1006 by combining extrema of the breaks and all basic objects obtained/determined in steps 1004 and 1005 to obtain a minimum and a maximum point, and using the minimum and the maximum point to form an orthogon (rectangle) aligned with coordinate axes. All polygons, i.e. faces in the break, are extended in "z-direction", determined by a common edge between two consecutive polygons, to stretch over the combined extrema box and limited by a vertex defined by the common edge. Further, if the polygon is not a closed loop (step 1009), its free ends, i.e. those edges that are not common, are extended in step 1010 to stretch over the combined extrema box. The thus formed polymesh/polyface is the extended polyline break. The extended break for a planar break is an infinite plane defined by the planar break.

After the break has been extended, i.e. after step 1010, or if the polygon is a closed loop (step 1009), after step 1008, or if the break has only one face (step 1002), amended basic objects hitting the extended break are obtained in step 1011 to a temporary list 7, and then the amount of basic objects is reduced by filtering them in step 1012. An exemplary filtering is described in more detail in FIG. 11. Thanks to this filtering functionality, the process is limited to the environment of the target break and to take into account only pour breaks created before the target break. Then temporary amended local pours are created in step 1013 from basic objects and pour breaks in the filtered temporary list 7. In the illustrated example, the temporary amended pours are pour graphs that define what is called herein components, not pours. Examples are illustrated in FIGS. 15 to 18. The thus obtained components are then processed in step 1014. The actual processing is described below in more detail with FIGS. 12 and 13, and the process ends with a result (step 1015) that a break is either updated to have a new geometry or deleted, i.e. added to delete list.

Figure 11:
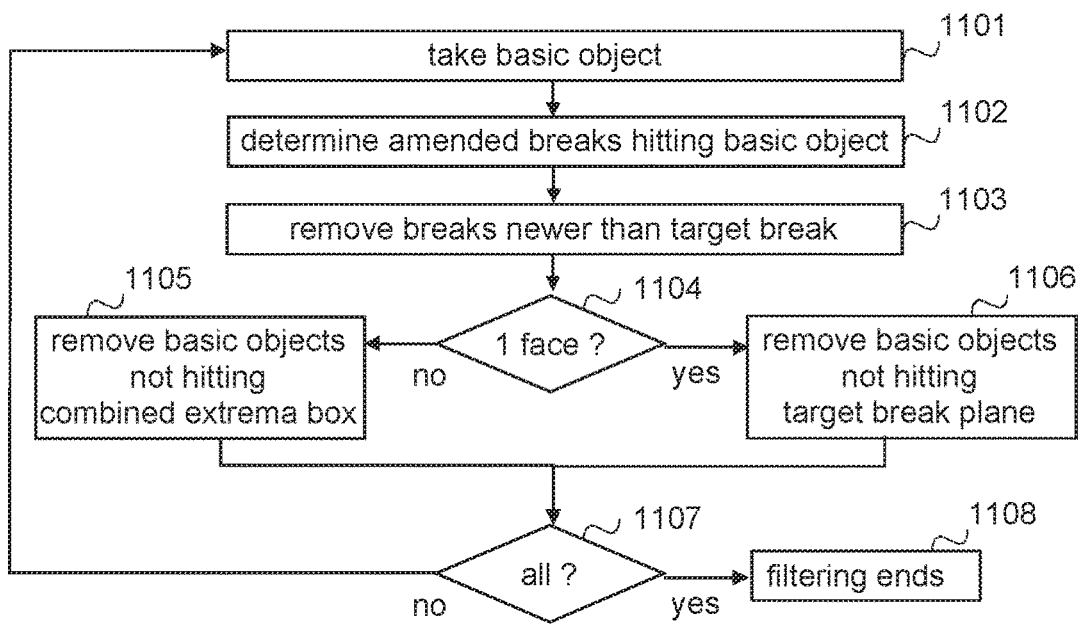

FIG. 11 illustrates an exemplary functionality how to filter away some of amended basic objects hitting the extended break that are obtained in step 1011 in FIG. 10, and included in the temporary list 7. More precisely, it describes an exemplary functionality to be performed in step 1012 in FIG. 10. In the example, it is assumed that at least one amended basic object has been found, i.e. the temporary list 7 is not empty.

Referring to FIG. 11, one of the amended basic objects in the temporary list 7 is taken in step 1101 to be processed. First, all breaks that are hitting the basic object in the amended situation, i.e. amended breaks, are determined in step 1102 and added to the temporary list 7, and breaks that have been created after the target break, i.e. newer breaks, are removed in step 1103 from the breaks determined in step 1102, i.e. from the temporary list 7. In other words, those breaks that have been created after, and hence are not affected by possible amendment of the target break, are filtered away. This functionality may be called as a first filter. This saves resources since processing them will end up to the same result as not processing them.

If the target break is a polyline break having two or more faces (step 1104), those basic objects not hitting the combined extrema box (described above with FIG. 10) are removed in step 1105 from the temporary list 7. After zero or more basic objects are removed, it is checked, in step 1107, whether or not all basic objects in the temporary list have been processed. If not, the process proceeds to step 1101 to take another basic object to be processed.

If the target break has one face (step 1104), those basic object that do not hit an infinite plane determined by the break are removed in step 1106 from the temporary list 7. After zero or more basic objects are removed, it is checked in step 1107, whether or not all basic objects in the temporary list 7 have been processed.

If all basic objects in the temporary list 7 have been processed, the filtering is ready (step 1108). Removals performed in steps 1105 and 1106 may be called as a second filter.

Figure 12:
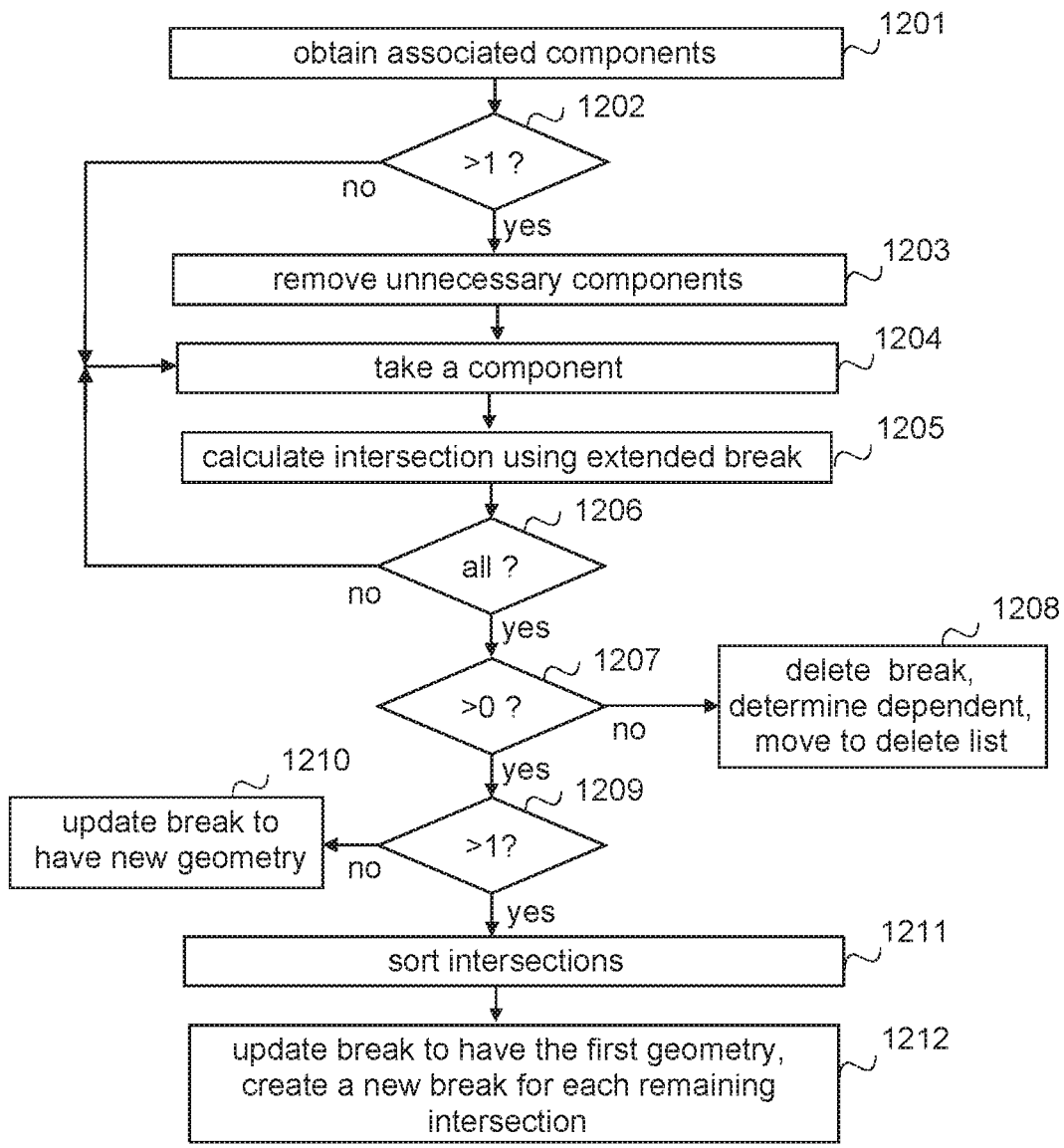
Figure 13:
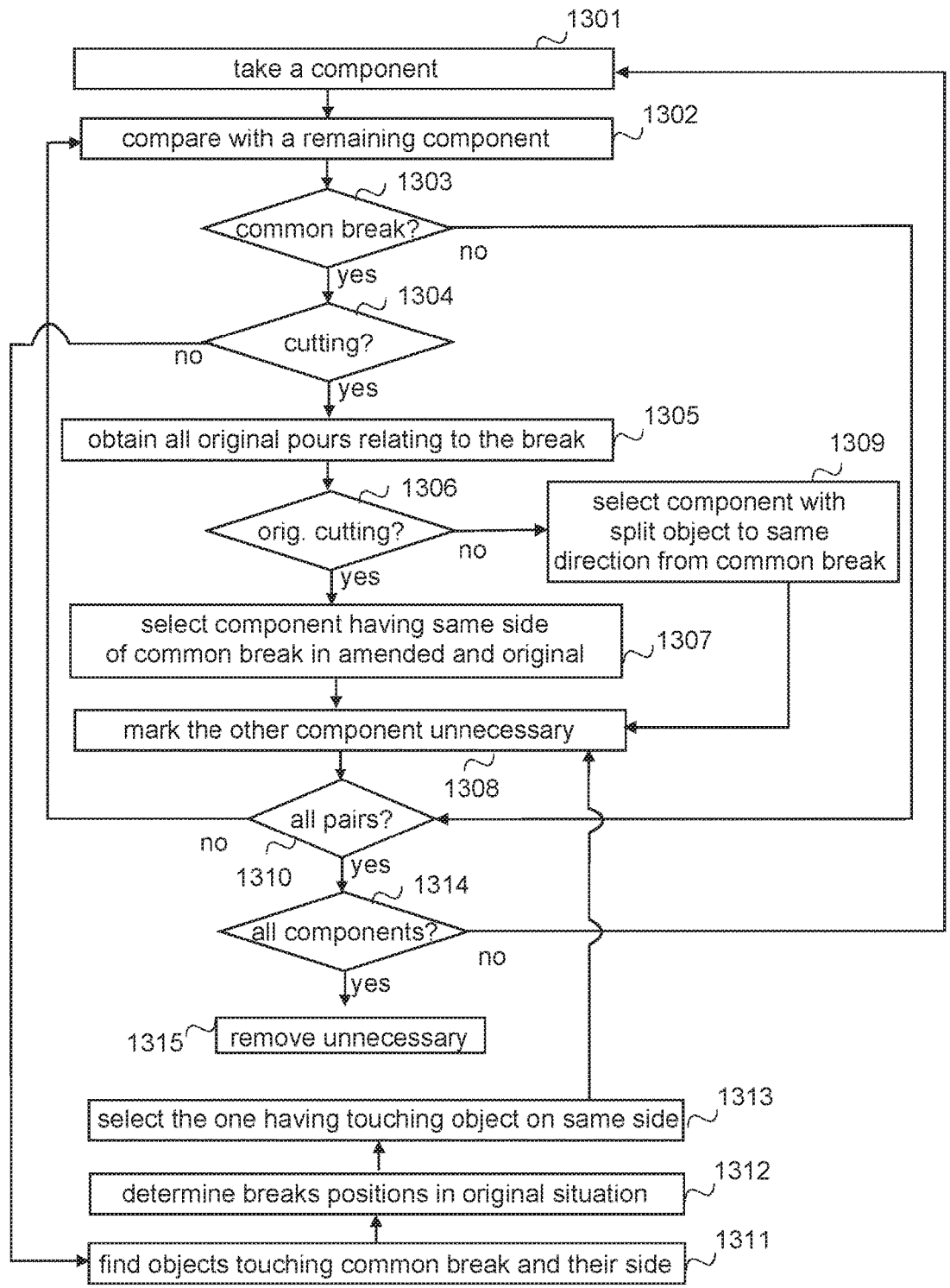

FIGS. 12 and 13 illustrate an exemplary functionality how to adapt breaks locally. More precisely, FIGS. 12 and 13 illustrate an exemplary functionality how to use local temporary pours, created in step 1013 in FIG. 10 to adapt breaks to correspond the amended situation, in step 1014 in FIG. 10. In the example below, it is assumed for the sake of clarity that there will be at least one component to process.

Referring to FIG. 12, the process starts by obtaining in step 1201 components of the local pours. Examples of local pours (i.e. components 1 and 2), created using the pour graphs, for a break B2 are illustrated in FIGS. 15 to 18.

If there are more than one component (step 1202), unnecessary components are removed in step 1203. The removing is described in more detail with FIG. 13.

If there is one component (step 1202), or after the unnecessary components have been removed, a component is taken in step 1204 to be processed. Zero or more intersections are calculated in step 1205 using the extended break and one or more basic objects indicated in the component (in the amended situation). Then the process proceeds to step 1206 to check, whether or not all components have been processed. If not, the process continues from step 1204 and takes the next component to be processed.

If all components have been processed (step 1206), it is checked (steps 1207, 1209), how many intersections/pour break geometries were found, i.e calculated: If no intersection was found (step 1207: no), the target break is deleted in step 1208, or more precisely, it is added to the delete list, dependent breaks of the target break are determined in step 1208, using the dependency map, and moved to the delete list in step 1208.

If exactly one intersection was found (step 1207: yes; step 1209: no), the target break is updated in step 1210 to have the new geometry defined by the intersection. For example, in FIG. 19, the break B1, originally defined by the basic object P2, is amended to have the geometry defined by basic objects P1 and P2, the amended geometry being denoted by B1'.

If more than one pour break geometries were found (step 1207: yes; step 1209: yes), the intersections are sort in step 1211 according to sort criteria. Any sort criterion or their combination may be used. For example, a size/area of the intersection may be used as a criterion and the sort order may be from the biggest to the smallest. Then break geometry of the target break is updated in step 1212 to have the geometry corresponding to the first intersection, and for each remaining intersection a new break is created in step 1212, having a geometry of the intersection in question. It should be appreciated that any other "mapping", i.e. selecting which ones of the intersection will be used for the target break, and which will be used for new breaks, may be used. For example, in FIG. 20, the break B1 is updated to have the geometry defined by the original break, the amended geometry being denoted by B1', and the basic object P1, and a new break B2 is created to have the geometry defined by the original break B1 and the basic object P3.

FIG. 13 illustrates an exemplary functionality how to determine unnecessary components from the temporary local pours. In the illustrated example, a component is compared with each other component. In other words, each possible pair of components are gone through and compared.

Referring to FIG. 13, a component is taken in step 1301 to be processed, and it is compared in step 1302 with one of the remaining components (i.e. unprocessed components) in the temporary local pour. If the components have a common break (step 1303), the components are separated by the common break. There are two types of breaks: a cutting break that splits a basic object into two or more parts and a touching break that goes along a boundary of a basic object.

Figure 15:
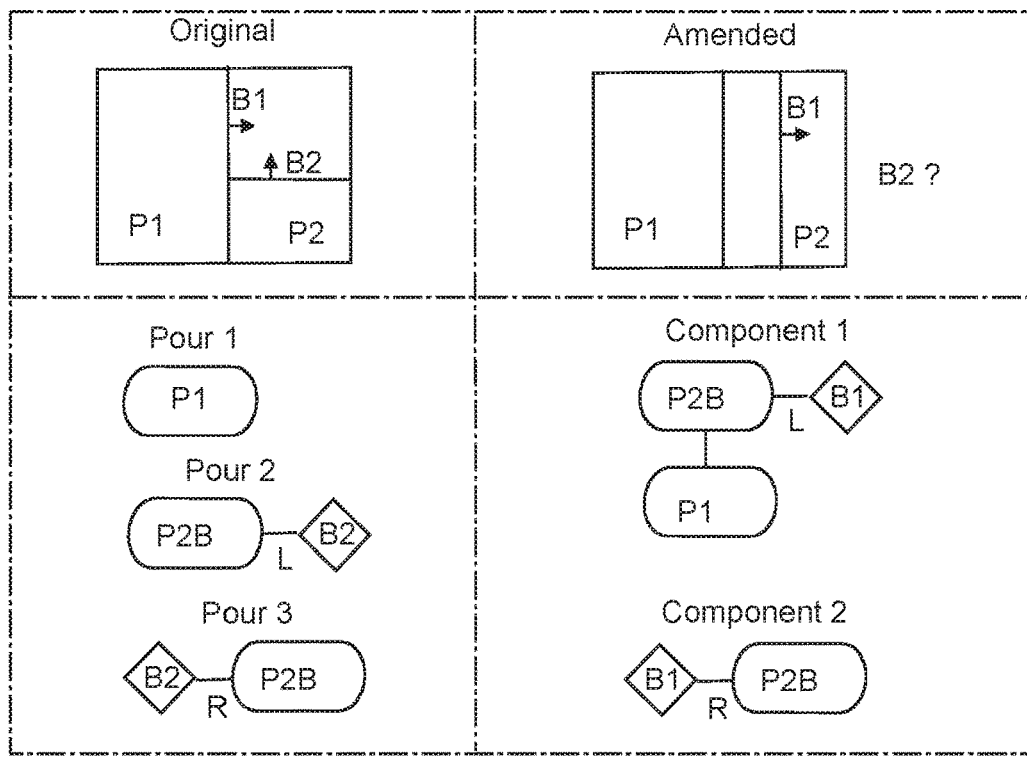
FIGS. 15 to 21 illustrate exemplary adapting situations.
Figure 16:
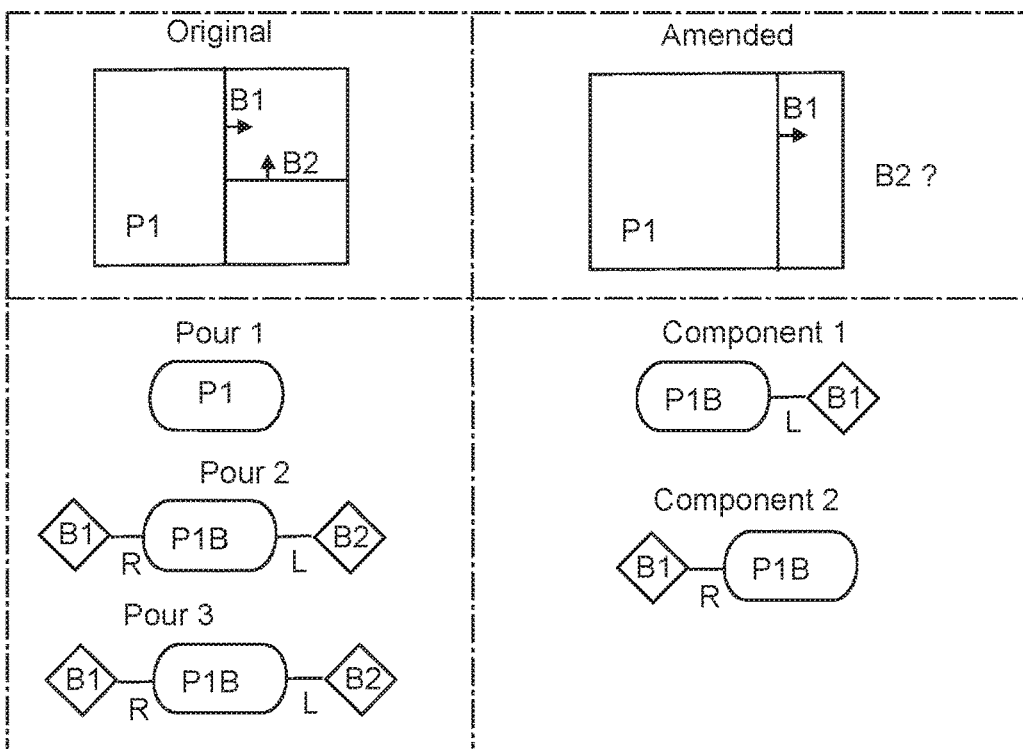

If the common break is a cutting break (step 1304), all original pours relating to the common break are obtained in step 1305. For example FIGS. 15 and 16 illustrate amended situations for target break B2 in which the common break B1 is a cutting break, the example in FIG. 15 having two basic objects, P1 and P2, the example in FIG. 16 having one basic object P1. The original pours obtained in step 1304 in the examples of FIGS. 15 and 16 are pours 1, 2 and 3. Then it is checked in step 1306, whether or not the common break is a cutting break in the original situation.

If the common break is a cutting break in the original situation (step 1306), the component that has the common break as the same side (left "L" or right "R") break both in the amended situation and in the original situation is selected in step 1307, and the other one of the component pair compared is marked as an unnecessary component in step 1308. For example, in the example of FIG. 16, since B1 was a cutting break for pours 2 and 3 in the right side, component 2 is selected and component 1 is marked to be an unnecessary component.

Then the process checks in step 1310, whether or not the component taken in step 1301 has been compared with all remaining components. If not, the process proceeds to step 1302 to compare the component with another remaining component.

If the common break is not a cutting break in the original situation (step 1306), it is a touching break, the component that has the common break on the same side in the amended situation as the target break is splitting a basic object in the original situation is selected in step 1309, and the other one of the component pair compared is marked as an unnecessary component in step 1308. For example, in the example of FIG. 15, since the target break B2 in the original situation locates to the right of the common break B1, the component 2 is selected, since the break B1 is a cutting break in the right side. So, if the common break in the original situation is a touching break, the pour graphs in the original situation are not used but the side is determined using the basic objects and the break in the original situation.

If there is no common break (step 1303), the process proceeds to step 1310 to check whether or not the component has been compared with all remaining components. One may say that if there is no common break, both components are selected.

If the common break is not a cutting break (step 1304), it is a touching break in the amended situation, the basic objects touching the common break in the amended situation, and their side is found/determined in step 1311. For example, in the examples illustrated in FIGS. 17 and 18, the common touching break is B1, and it is touching basic objects P1 and P2, P1 being left and P2 being right from the break B1 in the amended situation. Then the target break side, compared to the common break, in the original situation is determined in step 1312. In the examples illustrated in FIGS. 17 and 18, the break B2 is on the right side of the break B1. Then in step 1313 the component from the temporary pours is selected which has the basic object in the amended situation on the same side of the common break as is the target break in the original situation. In the examples illustrated in FIGS. 17 and 18, this means that since the basic object P2 is on the right side, component 2 is selected. Then the process proceeds to step 1308 to mark the other one of the component pair compared as an unnecessary component.

If the component has been compared with all remaining components (step 1310), it is checked in step 1314, whether or not the comparison is made to all components. If not, the process proceeds to step 1301 to take another component to be compared with other components.

If all components have been compared with other components (step 1314), the unnecessary components are known and can be removed (step 1315) before calculating intersections in FIG. 12. Thanks to removing the unnecessary components, calculation of intersections will be faster, and it is easier to ensure that there will not be overlapping breaks.

Figure 17:
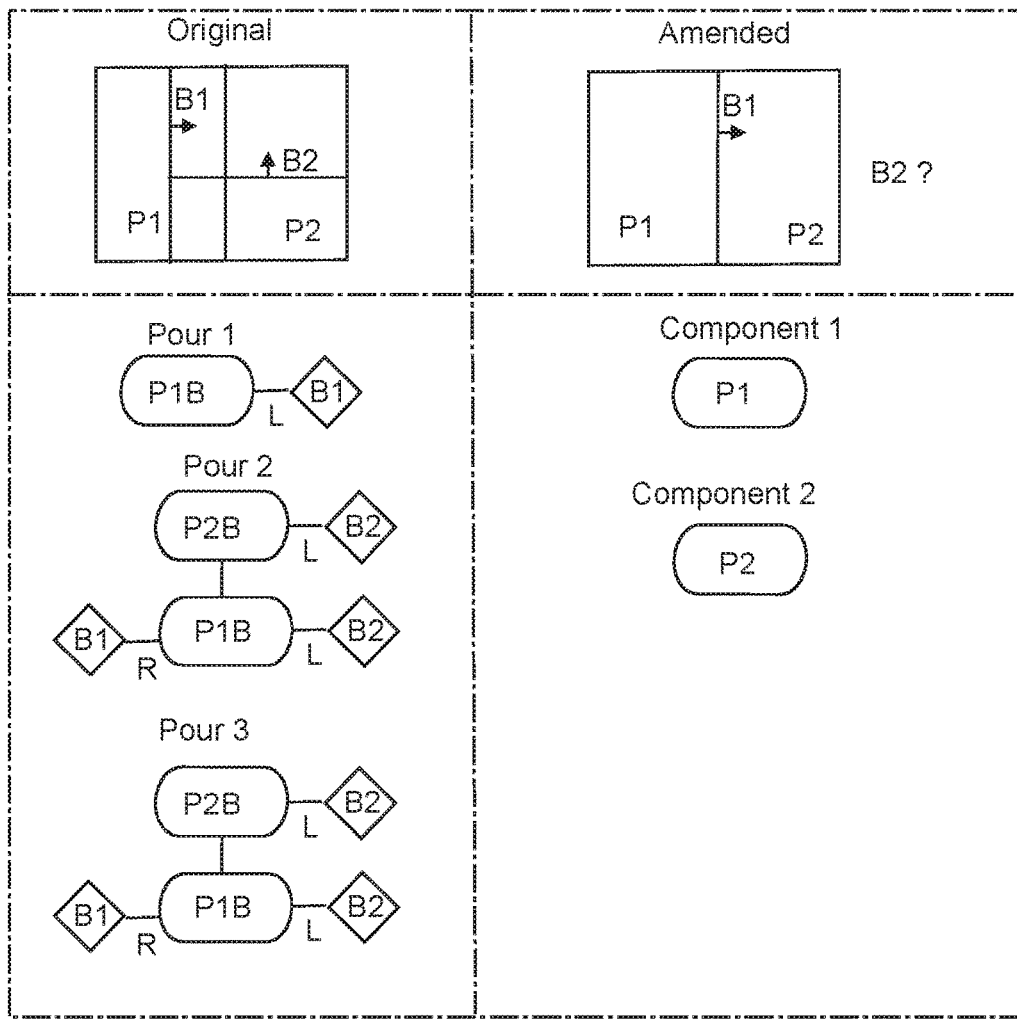
Figure 18:
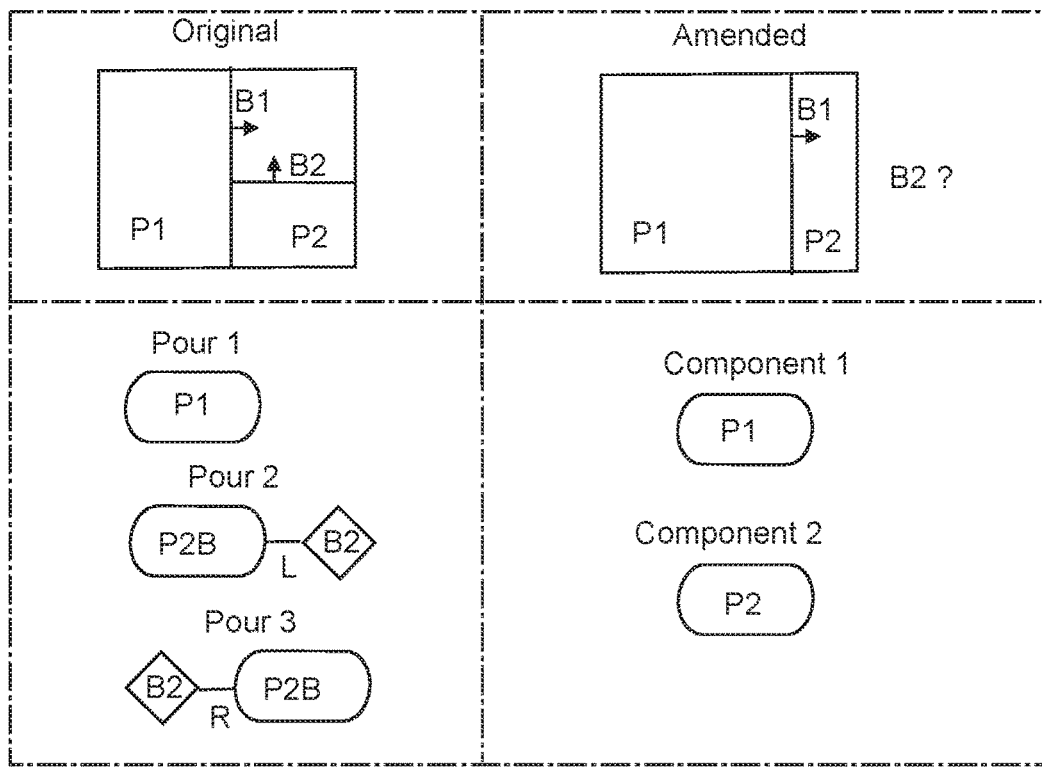

As said above, FIGS. 15 to 18 illustrate different examples. In FIG. 15, there are two basic objects that are not modified but the break B1 is modified by moving it from a "border" between the basic objects P1 and P2 to locate on the basic object P2. In FIG. 16, there is one basic object that is not modified but the break B1 is moved to another location. In FIG. 17, there are two basic objects that are not modified but the break B1 is modified by moving it from the basic object P1 to a "border" between the basic objects P1 and P2. In FIG. 18, there are two basic objects that are modified with the break B1 so that sizes of the basic objects are modified by moving a "border" between the basic objects P1 and P2, and the break B1 is moved simultaneously.

Figure 19:
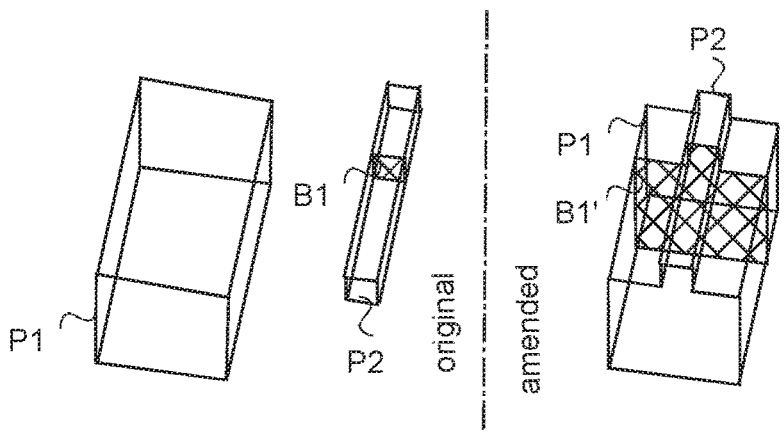

In the example illustrated in FIG. 19, the basic object P2 having a break B1 and the break B1 are moved to locate on top of the basic object P1, and the pour break geometry is adapted to be an intersection of an extended plane defined by B1 in the amended situation and P1 and P2. In the original situation there are two continuous cast products: one represented by P1 to be manufactured by one pour, the other one represented by P2, to be manufactured by two pours because of B1. In the amended situation there is one continuous cast product represented by the connected P1 and P2, to be manufactured by two pours because of B1'.

In the example illustrated in FIG. 20, a basic object P2 is deleted from the model, and the pour break geometry is adapted to be two pour breaks geometries. In the original situation there is one continuous cast product represented by connected P1, P2, and P3 to be manufactured by two pours because of B1. In the amended situation there are two continuous cast products: one represented by P1 to be manufactured by two pours because of B1', the other one represented by P3, to be manufactured by two pours because of B2.

Figure 21:
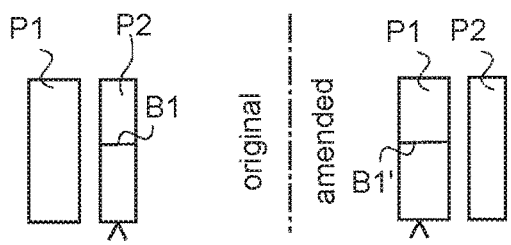

In the example illustrated in FIG. 21, basic objects P1 and P2 are moved to a new location while a break B1 remains in the same location (the location being denoted by ^). After the movement, the break B1 hits P1, not P2, and hence its geometry is adapted/updated correspondingly. In the original situation there are two continuous cast products: one represented by P1 to be manufactured by one pour, the other one represented by P2, to be manufactured by two pours because of B1. In the amended situation there are two continuous cast products: one represented by P1 to be manufactured by two pours because of B1', the other one being represented by P2, to be manufactured by one pour.

Figure 14:
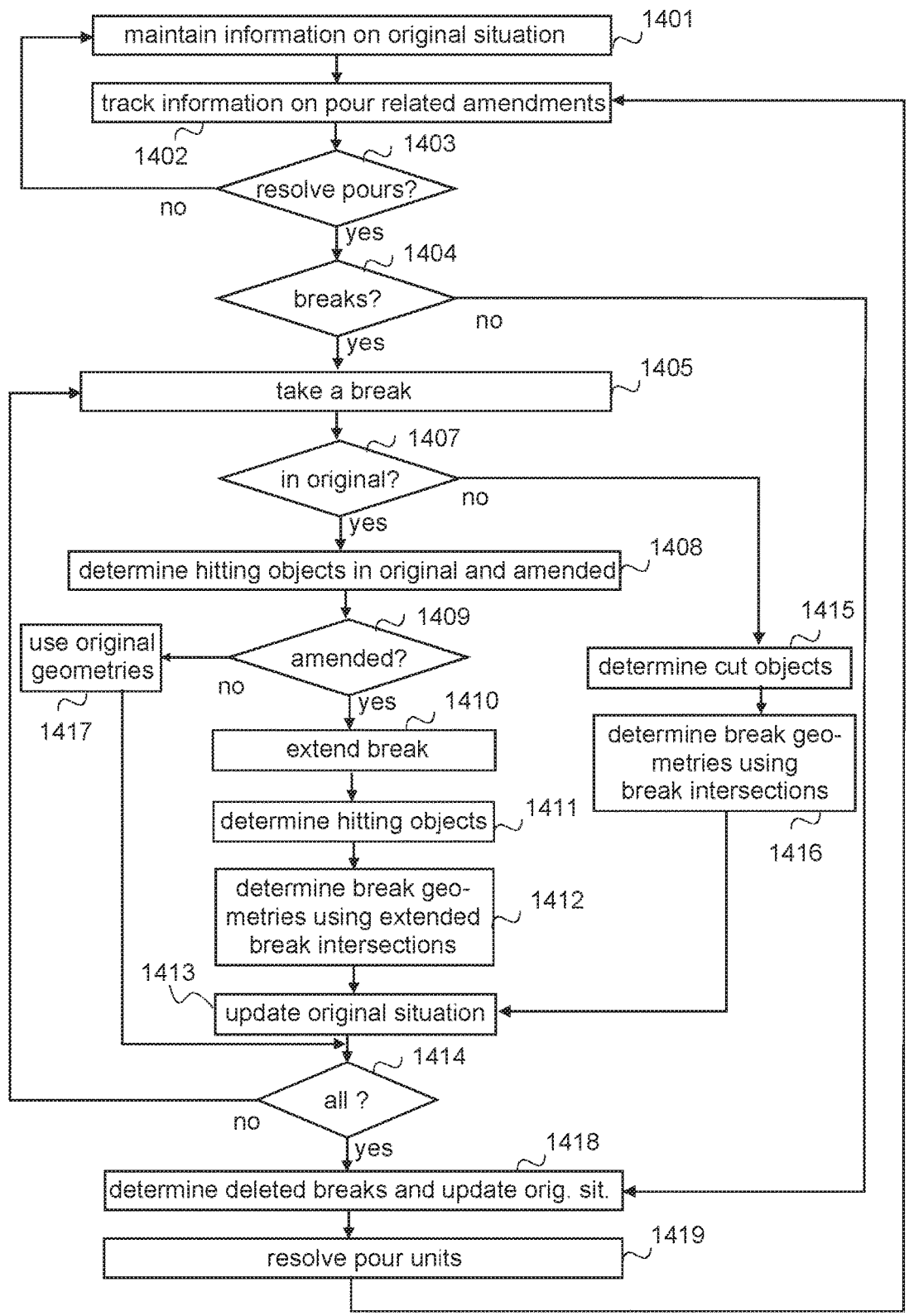

FIG. 14 is a flow chart describing another exemplary functionality how to adapt the pour breaks to be in accordance with an amended situation. The functionality may be performed by the break adapting unit, or by the break adapting unit and the pour unit. Further, in the example it is illustrated that the adapting in performed only in response to a specific user command without restricting the implementation to such a solution.

Referring to FIG. 14, the information on original situation is maintained as unamended in step 1401 while the modifications and amendments are tracked (monitored) in step 1402, until a user input "resolve pour units in the selection" is received (step 1403).

When the user input "resolve pour units in the selection" is received, it is checked in step 1404, whether or not the selection contains any breaks in the amended situation. If it does, a break is taken in step 1405 to be processed and it is checked in step 1406, whether or not the selection, when the original situation definitions are used, contains the break. If the break is also in the original situation, basic objects hitting the break in the original situation are determined in step 1407 and basic objects hitting the break in the amended situation are determined in step 1408. Then it is checked in step 1409, whether or not the tracked amendments indicate that any of the thus found basic objects are amended.

If at least one of the basic object(s) is amended (step 1409), the break in the amended situation is extended in step 1410, for example as described above, and the basic objects hitting the extended break in the amended situation are determined in step 1411, as well as basic objects connected to the hitting basic objects. Then one or more adapted pour break geometries are determined in step 1412 based on intersections of the hitting basic objects, including the connected ones, and the extended break in the amended situation. Further, in the illustrated example, the original situation is updated in step 1413 correspondingly, as well as the tracked amendments. Then it is checked in step 1414 whether or not all breaks are processed. If not, the process returns to step 1405 to take another break to be processed.

If the break is not in the original situation (step 1406), it is a new break that does not need adaptation, and the process proceeds to step 1415 to determine basic objects, or basic objects parts, in the amended situation that are cut by the break, and one or more pour break geometries are determined in step 1416 based on intersections of the cut basic objects/basic object parts, including connected basic objects, and the break in the amended situation. A basic object part is obtained from a basic object, or from another basic object part, that is cut into at least two parts by the pour break. Then the process proceeds to step 1413 to update information.

If none of the basic object is amended (step 1409), the original break geometry is used (step 1417).

If there are no breaks in the amended situation (step 1404), or if all are processed (step 1414), the breaks that are in the original situation but that are indicated as deleted breaks (i.e. they are not in the amended situation), are determined in step 1418, and the original situation is updated in step 1418 correspondingly, as well as the tracked amendments. Then the pour units are created in step 1419, using the determined break geometries and basic objects in the amended situation, and the process returns to step 1402 to track amendments.

As is evident from the above in modeling applications in which pour units are created/resolved based on basic objects and pour breaks, the dilemma caused by the facts that determination of pour geometries is needed before geometry of pour breaks can be adapted to correspond to the amended situation but the pour geometries can be determined only after the geometry of the pour breaks is adapted, is solved by maintaining information in the original situation while tracking modifications, and when pour units are created/resolved, first determining how basic objects connect to each other, then determining the geometry of the pour breaks, and only after that determining the pour units. To ensure that proper geometry is used for determining the geometry of a pour break, ensure that later created pour breaks do not disturb/affect the determination of the geometry and to limit the process to handle only basic object relevant to the pour break in question, the basic objects may be filtered using the second filter described above with FIG. 11 and the pour breaks may be filtered using the first filter described above with FIG. 11.

The steps shown in FIGS. 2 to 14 are not in an absolutely chronological order, and they may be executed in a different order than given here, or simultaneously. For example, functionality described in FIGS. 5 and 6 may be combined so that in step 509 the functionality of FIG. 6 is performed, and in step 506 the functionality of FIG. 6 is performed to each found object so that there will be no event queue comprising only object but the end result is directly the adapt queue. Other functions may be carried out between the described steps or simultaneously with them. For example, before adding an identifier to a list or a queue, other than the event queue, it is checked, whether or not the identifier is already in the list/queue, and if the identifier is already therein, it is not any more added. Another example is that between step 203 and step 204 it may be checked for a basic object, whether or not the basic object is related with one or more breaks in the original situation and whether or not the basic object is related with one or more breaks after the modification, and if the basic object is related with one or more breaks at least either in the original or in the amended situation, the identifier and the modifying event is added to the event queue. It is also possible to leave out some or all of the steps shown in the Figures. It is also possible to replace some of the described steps by a step that produces a corresponding end result.

Figure 22:
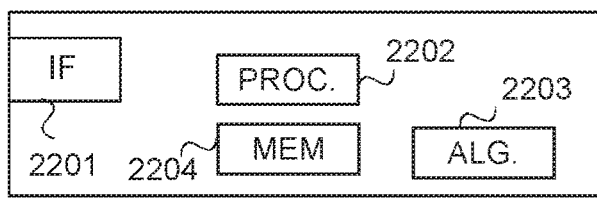
FIG. 22 is a schematic block diagram of an exemplary apparatus.

FIG. 22 is a simplified block diagram illustrating some units for an apparatus 2200 configured to be an apparatus comprising at least the break adapting unit. In the illustrated example the apparatus comprises one or more interfaces (IF) 2201 for interaction with a user, and possibly for receiving and transmitting information, a processor 2202 configured to implement at least the break adapting unit, or at least one of its sub-units, functionality described herein with a corresponding algorithm/algorithms 2203 and a memory 2204 usable for storing a program code required at least for the break adapting unit, i.e. the algorithms for implementing the functionality. The processor 2202 may be configured to implement also the pour unit and/or the event monitoring unit or any related sub-unit with a corresponding algorithm/algorithms. A program code required for it/them may be stored to the memory 2204. The memory 2204 is also usable for storing other possible information, like the model or the working copy of the model. An embodiment provides a computer program embodied on any client-readable distribution/data storage medium or memory unit(s) or article(s) of manufacture, comprising program instructions executable by one or more processors/computers, which instructions, when loaded (downloaded) into an apparatus, constitute the break adapting unit, and possibly also other units mentioned herein. Programs, also called program products, including software routines, program snippets constituting "program libraries", applets and macros, can be stored in any medium and may be downloaded into an apparatus. In other words, each or some or one of the units/sub-units and/or the algorithms described above may be an element that comprises one or more arithmetic logic units, a number of special registers and control circuits.

Generally the processor 2202 is a central processing unit, but the processor 2202 may be an additional operation processor, controller, control unit, micro-controller, a single-chip computer element, a chipset, or the like connected to a memory and to various interfaces of the apparatus.

More precisely, each or some or one of the units and/or algorithms described herein by means of any of FIGS. 2 to 21 may be configured as a computing device including at least a memory for providing storage area used for arithmetic operation and an operation processor for executing the arithmetic operation. Each or some or one of the units and/or algorithms described above may comprise one or more computer processors, logic gates, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments/implementations/examples or to perform functionalities from different embodiments/examples/implementations. In other words, each or some or one of the units and/or the algorithms described above may be an element that comprises one or more arithmetic logic units, a number of special registers and control circuits.

Further, the memory 2204 may include volatile and/or non-volatile memory, for example EEPROM, ROM, PROM, RAM, DRAM, SRAM, double floating-gate field effect transistor, firmware, programmable logic, etc. and typically store content, data, or the like. The memory 2204 or memories may be of any type (different from each other), have any possible storage structure and, if required, being managed by any database management system. The memory may also store computer program code such as software applications (for example, for one or more of the units/algorithms) or operating systems, information, data, content, or the like for the processor to perform steps associated with operation of the apparatus in accordance with examples/embodiments. The memory, or part of it, may be, for example, random access memory, a hard drive, or other fixed data memory or storage device implemented within the processor/apparatus or external to the processor/apparatus in which case it can be communicatively coupled to the processor/network node via various means as is known in the art. Examples of an external memory include a removable memory detachably connected to the apparatus and a cloud server.

It will be obvious to a person skilled in the art that, as the technology advances, the inventive concept can be implemented in various ways. The invention and its embodiments are not limited to the examples described above but may vary within the scope of the claims.

What is claimed is:

1. A computerized method comprising:
   reading, by a modelling application executed by a processor, into a run-time database a model comprising at least one or more basic objects modeling at least one continuous cast product, and at least one pour break, a pour break being an object that has a shape with a surface, two different sides and a location in the model, the surface not being a non-manifold surface and the location being a location in which a user input indicates an intent to break a continuous cast product according to the definitions of the shape of the pour break for the continuous cast product to be manufactured by two or more pours, the read in data forming an original situation;
   maintaining, by the modeling application, in the run-time database amendments relating at least to object definitions made to the model, the amendments and non-amended original data forming an amended situation;
   maintaining, by the modeling application, in the run-time database an event queue containing information on amended basic objects and amended pour breaks, each associated with information indicating an undergone amendment;
   compacting the event queue by removing some events that do not affect the at least one continuous cast product from the event queue and keeping only those other events that affect the at least one continuous cast product in the event queue; and
   adapting, by the modeling application, geometries of one or more pour breaks in the event queue by comparing the original situation and the amended situation of the one or more pour breaks, wherein a geometry of a pour break is determined by an intersection of the shape of the pour break in the location and the one or more basic objects.

2. The computerized method of claim 1, further comprising stopping, by the modeling application, maintaining the event queue while adapting the geometries of the pour breaks.

3. The computerized method of claim 1, wherein the adapting further comprises:
   forming, by the modeling application, an amended event queue by transforming each pour break in the event queue that is indicated as deleted to zero or more basic objects that relate to the pour break in the original situation, and by transforming each other pour break in the event queue to zero or more basic objects that relate to the pour break in the amended situation; and
   transforming, by the modeling application, each basic object in the amended event queue to a pour break by transforming each basic object that is indicated as deleted to zero or more pour breaks that relate to the basic object in the original situation, and by transforming each other basic object in the event queue to zero or more pour breaks that relate to the basic object in the amended situation.

4. The computerized method of claim 3, further comprising:
   determining, by the modeling application, pour breaks that depend on a pour break that will be deleted; and removing, by the modeling application, the pour breaks that depend on a pour break that will be deleted from the event queue before performing adapting.

5. The computerized method of claim 1, wherein adapting a pour break comprises:
   extending, by the modeling application, the pour break in the amended situation;
   determining, by the modeling application, basic objects hitting the extended pour break in the amended situation;
   using, by the modeling application, intersections of the extended pour break and zero or more hitting basic objects in the amended situation to define zero or more adapted geometries of the pour breaks.

6. A computerized method as claimed in claim 5, further comprising:
   determining, by the modeling application, all pour breaks that are hitting the hitting basic objects in the amended situation; and
   removing, by the modeling application, pour breaks that are newer than the pour break whose geometry is to be adapted.

7. The computerized method of claim 1, further comprising:
   creating, by the modeling application, at least one pour graph in the original situation and at least one component graph in the amended situation; and
   using, by the modeling application, the graphs when adapting.

8. The computerized method of claim 7, further comprising
   selecting, by the modeling application, in response to having two or more component graphs having a common pour break, one of the component graphs according to one or more specific rules.

9. A computerized method comprising:
   maintaining, in a memory, an updated version of a model comprising at least one or more basic objects modeling at least one continuous cast product, and at least one pour break, a pour break being an object that has a shape with a surface, two different sides and a location in the model, the surface not being a non-manifold surface and the location being a location in which a user input indicates an intent to break a continuous cast product according to the definitions of the shape of the pour break for the continuous cast product to be manufactured by two or more pours, the data in the updated version forming an original situation;
   maintaining, in the memory, amendments relating at least to object definitions made to the model after the updated version was last time updated, the amendments and non-amended updated data forming an amended situation;
   maintaining, in the memory, an event queue containing information on amended basic objects and amended pour breaks, each associated with information indicating an undergone amendment;
   compacting the event queue by removing some events that do not affect the at least one continuous cast product from the event queue and keeping only those other events that affect the at least one continuous cast product in the event queue;
   using, by a modeling application, the information in the event queue to determine pour breaks that may need adaptation; and
   performing, by the modeling application, an adaptation process to pour breaks that may need adaptation, the adaptation process for a pour break comprising using both a geometry of the pour break in the original situation, which is determined by an intersection of the shape of the pour break and the one or more basic objects in the location in the original situation, and geometries of basic objects hitting the pour break or its extension in the amended situation to determine a geometry of the pour break in the amended situation.

10. The computerized method of claim 9, further comprising stopping, by the modeling application, maintaining of the event queue while performing the adaptation process.

11. The computerized method of claim 9, wherein the adaptation process further comprises:
    forming, by the modeling application, an amended event queue by transforming each pour break in the event queue that is indicated as deleted to zero or more basic objects that relate to the pour break in the original situation, and by transforming each other pour break in the event queue to zero or more basic objects that relate to the pour break in the amended situation; and
    transforming, by the modeling application, each basic object in the amended event queue to a pour break by transforming each basic object that is indicated as deleted to zero or more pour breaks that relate to the basic object in the original situation, and by transforming each other basic object in the event queue to zero or more pour breaks that relate to the basic object in the amended situation.

12. The computerized method of claim 11, wherein the adaptation process further comprises:
    determining, by the modeling application, pour breaks that depend on a pour break that will be deleted; and
    removing, by the modeling application, the pour breaks that depend on a pour break that will be deleted from the event queue before performing adapting.

13. The computerized method of claim 9, wherein the adaptation process for a pour break further comprises:
    extending, by the modeling application, the pour break in the amended situation;
    determining, by the modeling application, basic objects hitting the extended pour break in the amended situation;
    using, by the modeling application, intersections of the extended pour break and zero or more hitting basic objects in the amended situation to define zero or more adapted geometries of the pour breaks.

14. The computerized method of claim 13, wherein the adaptation process further comprises:
    determining, by the modeling application, all pour breaks that are hitting the hitting basic objects in the amended situation; and
    removing, by the modeling application, pour breaks that are newer than the pour break whose geometry is to be adapted.

15. The computerized method of claim 9, wherein the adaptation process further comprises:
    creating, by the modeling application, at least one pour graph in the original situation and at least one component graph in the amended situation; and
    using, by the modeling application, the graphs when adapting.

16. The computerized method of claim 15, wherein the adaptation process further comprises:
    selecting, by the modeling application, in response to having two or more component graphs having a common pour break, one of the component graphs according to one or more specific rules.

17. An apparatus comprising:
at least one processor; and
at least one memory including computer program code;
the at least one memory and the computer program code configured to, with the at least one processor, cause the apparatus at least to:
maintain a first version of a model comprising at least one or more basic objects modeling at least one continuous cast product, and at least one pour break, a pour break being an object that has a shape with a surface, two different sides and a location in the model, the surface not being a non-manifold surface and the location being a location in which a user input indicates an intent to break a continuous cast product according to the definitions of the shape of the pour break for the continuous cast product to be manufactured by two or more pours, the data in the first version forming an original situation;
maintain amendments relating at least to object definitions made to the model after the first version was last time updated, the amendments and non-amended updated data forming an amended situation;
maintain, an event queue containing information on amended basic objects and amended pour breaks, each associated with information indicating an undergone amendment;
compact the event queue by removing some events that do not affect the at least one continuous cast product from the event queue and keeping only those other events that affect the at least one continuous cast product in the event queue;
use the information in the event queue to determine pour breaks that may need adaptation; and
perform an adaptation process to pour breaks that may need adaptation, the adaptation process for a pour break comprising using both a geometry of the pour break in the original situation, which is determined by an intersection of the shape of the pour break and the one or more basic objects in the location in the original situation, and geometries of basic objects hitting the pour break or its extension in the amended situation to determine a geometry of the pour break in the amended situation.

18. A system comprising a modeling environment comprising:
at least one memory for storing a model comprising at least one or more basic objects modeling at least one continuous cast product, and at least one pour break, a pour break being an object that has a shape with a surface, two different sides and a location in the model, the surface not being a non-manifold surface and the location being a location in which a user input indicates an intent to break a continuous cast product according to the definitions of the shape of the pour break for the continuous cast product to be manufactured by two or more pours; and
at least one terminal device configured to read into a run-time database the model, and to adapt pour break geometries of read into pour breaks to correspond to amendments relating at least to object definitions by limiting the adaptation of the geometry of an amended pour break to take into account one or more basic objects hitting the amended pour break or its extension in the amended situation, and by limiting the adaptation of the geometry of a non-amended pour break to concern one or more amended basic objects hitting the non-amended pour break in at least one of the read into situation and the amended situation, wherein at least one of the at least one terminal device is further configured to:
maintain in the run-time database an event queue containing information on amended basic objects and amended pour breaks, each associated with information indicating an undergone amendment; and
compact the event queue by removing some events that do not affect the at least one continuous cast product from the event queue and keeping only those other events that affect the at least one continuous cast product in the event queue.

19. The system of claim 18, wherein at least one of the at least one terminal device is further configured to:
maintain in the run-time database amendments relating at least to object definitions made to the model, the amendments and non-amended read into data forming an amended situation; and
adapt geometries of one or more pour breaks in the event queue by comparing the read into situation and the amended situation of the one or more pour breaks, wherein a geometry of a pour break is determined by an intersection of the shape of the pour break in the location and the one or more basic objects.

20. A non-transitory computer readable media comprising program code that, when executed by a computing apparatus, will cause the computing apparatus to:
retrieve into a run-time database a model comprising at least one or more basic objects modeling at least one continuous cast product, and at least one pour break, a pour break being an object that has a shape with a surface, two different sides and a location in the model, the surface not being a non-manifold surface and the location being a location in which a user input indicates an intent to break a continuous cast product according to the definitions of the shape of the pour break for the continuous cast product to be manufactured by two or more pours, the read in data forming an original situation;
maintain the run-time database amendments relating at least to object definitions made to the model, the amendments and non-amended original data forming an amended situation;
maintain in the run-time database an event queue containing information on amended basic objects and amended pour breaks, each associated with information indicating an undergone amendment;
compact the event queue by removing some events that do not affect the at least one continuous cast product from the event queue and keeping only those other events that affect the at least one continuous cast product in the event queue; and
adapt geometries of one or more pour breaks in the event queue by comparing the original situation and the amended situation of the one or more pour breaks, wherein a geometry of a pour break is determined by an intersection of the shape of the pour break in the location and the one or more basic objects.

21. The non-transitory computer readable media of claim 20, wherein the program code is for computer aided modeling application.

22. A non-transitory computer readable media comprising program code that, when executed by a computing apparatus, will cause the computing apparatus to:
maintain an updated version of a model comprising at least one or more basic objects modeling at least one continuous cast product, and at least one pour break, a pour break being an object that has a shape with a surface, two different sides and a location in the model, the surface not being a non-manifold surface and the location being a location in which a user input indicates an intent to break a continuous cast product according to the definitions of the shape of the pour break for the continuous cast product to be manufactured by two or more pours, the data in the updated version forming an original situation;

maintain amendments relating at least to object definitions made to the model after the updated version was last time updated, the amendments and non-amended updated data forming an amended situation;

maintain an event queue containing information on amended basic objects and amended pour breaks, each associated with information indicating an undergone amendment;

compact the event queue by removing some events that do not affect the at least one continuous cast product from the event queue and keeping only those other events that affect the at least one continuous cast product in the event queue;

determine pour breaks that may need adaptation by using the information in the event queue to; and perform an adaptation process to pour breaks that may need adaptation, the adaptation process for a pour break comprising using both a geometry of the pour break in the original situation, which is determined by an intersection of the shape of the pour break and the one or more basic objects in the location in the original situation, and geometries of basic objects hitting the pour break or its extension in the amended situation to determine a geometry of the pour break in the amended situation.

23. The non-transitory computer readable media of claim 22, comprising further program code that, when executed by the computing apparatus, will cause the computing apparatus to stop maintaining the event queue during the adaptation process.

\* \* \* \* \*